Dec. 28, 1954     C. F. ALSING     2,697,916
MULTIPLE TEMPERATURE HOUSEHOLD REFRIGERATOR
AND METHOD OF REFRIGERATION
Filed June 3, 1953     17 Sheets-Sheet 7
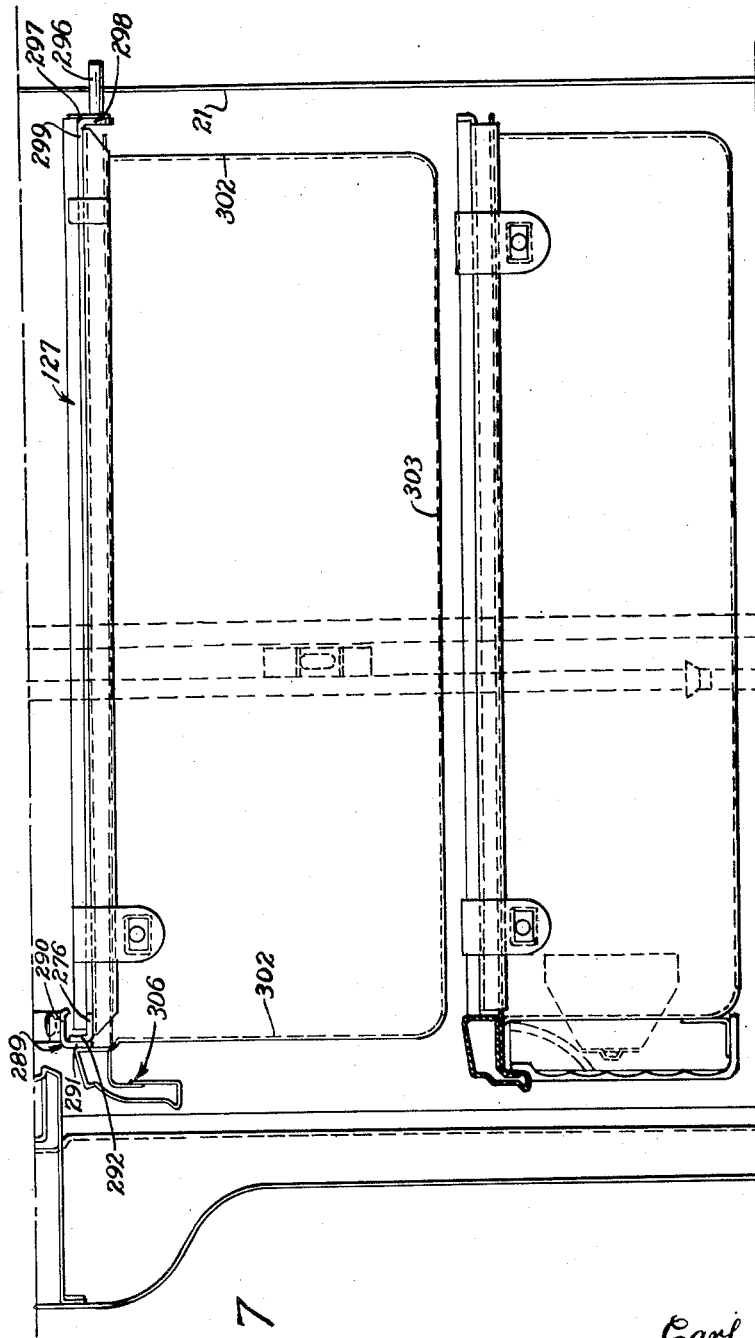
INVENTOR.
Earl F. Alsing
BY Robert H. Wendt
Atty.

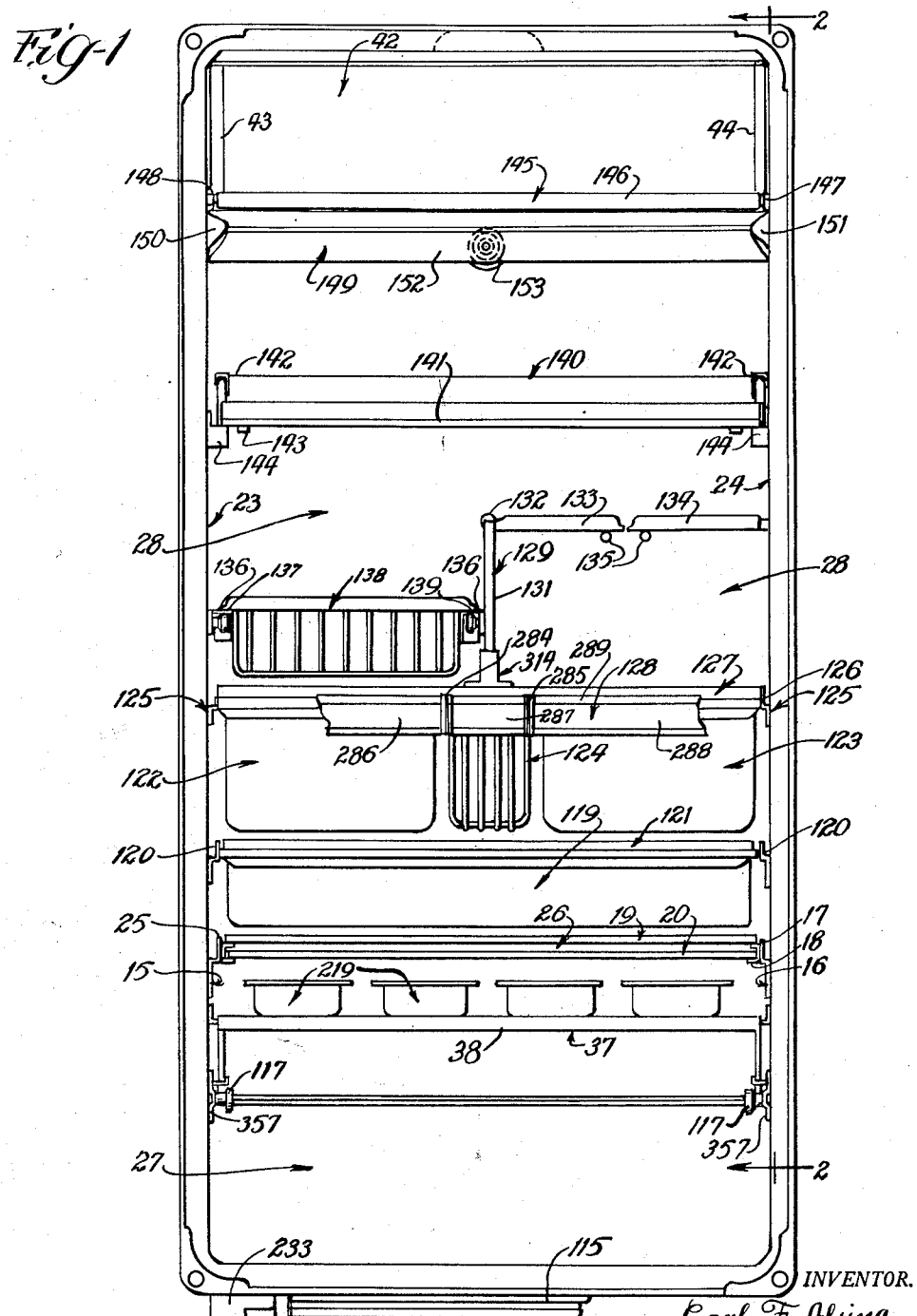

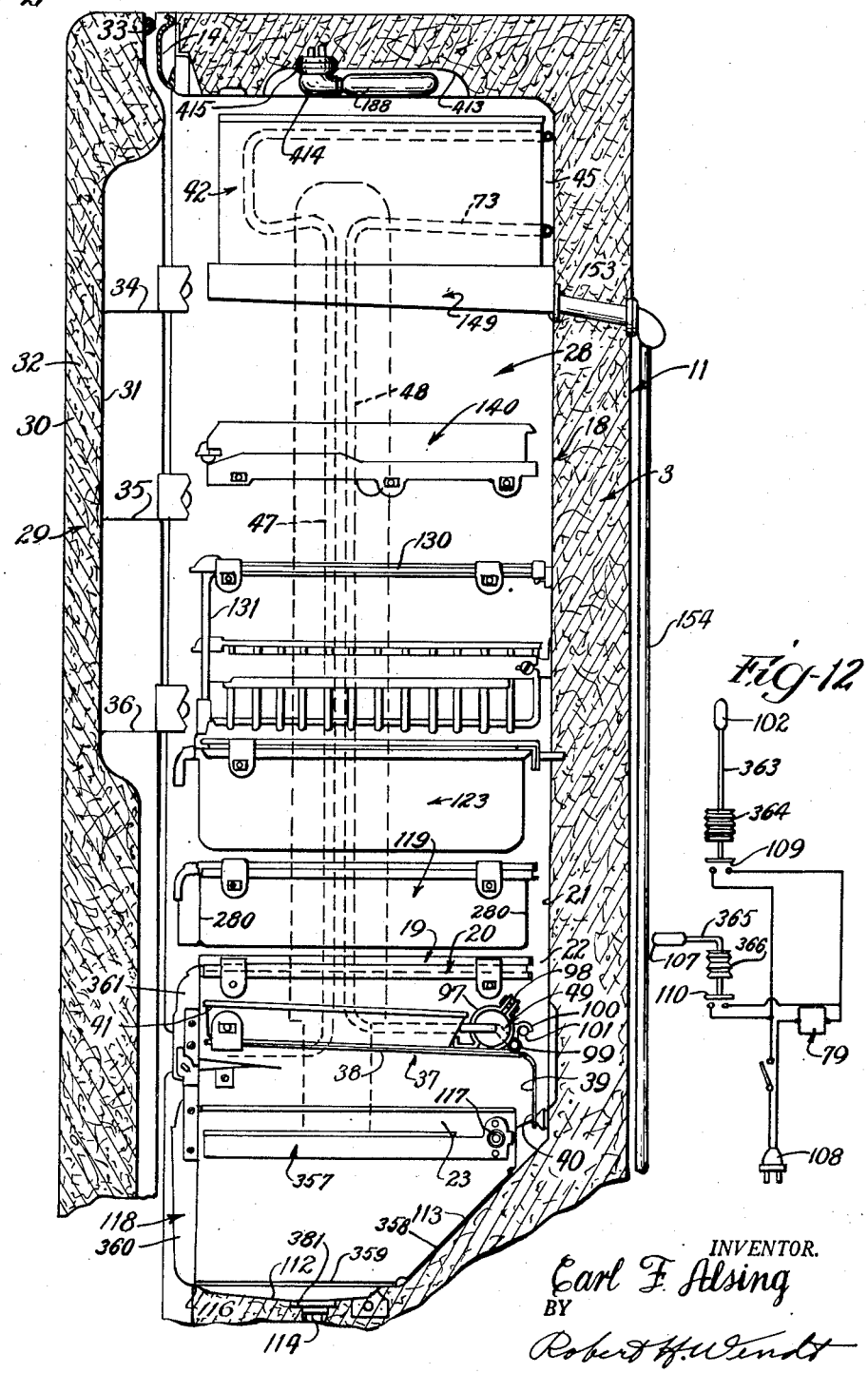

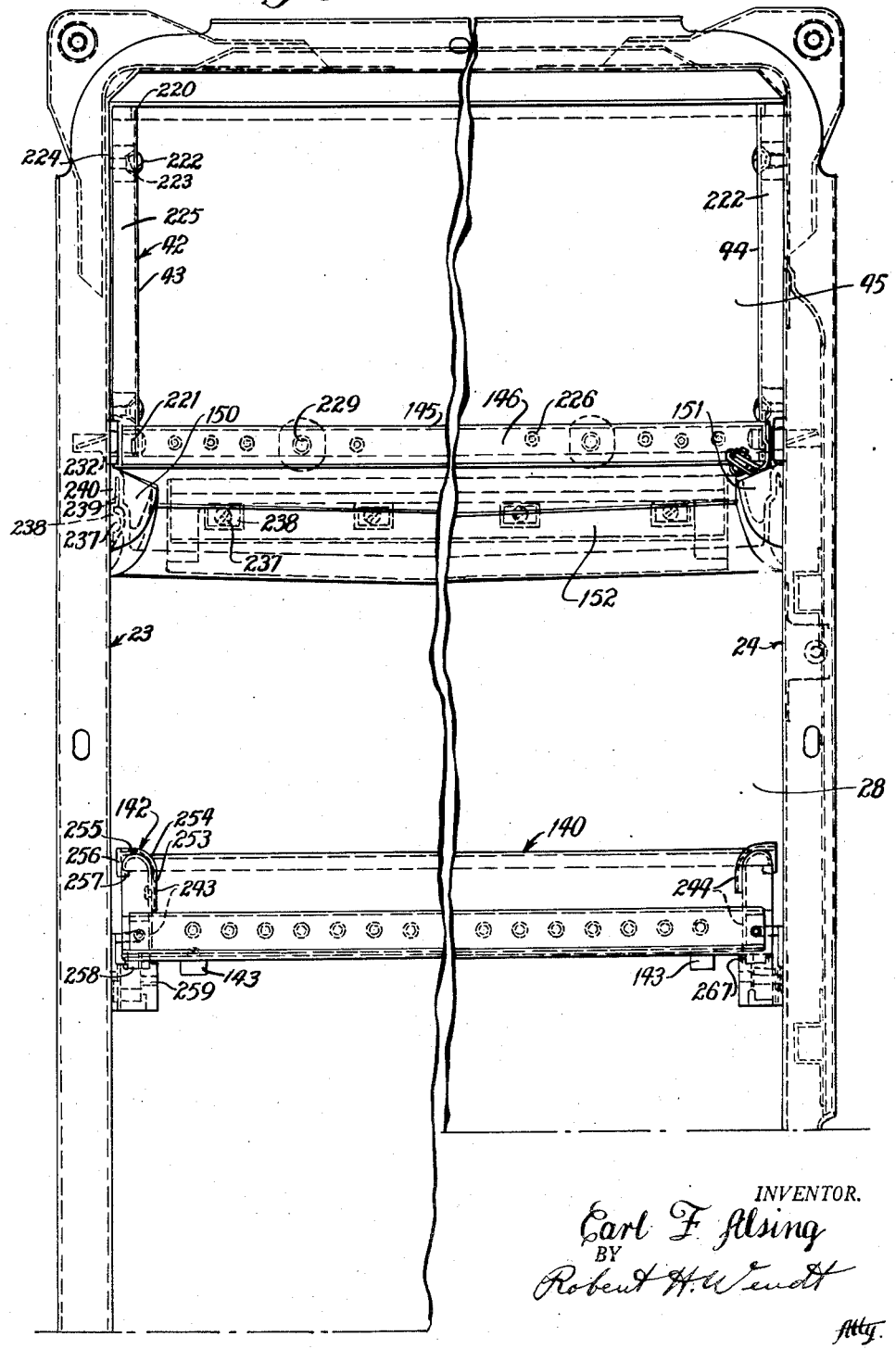

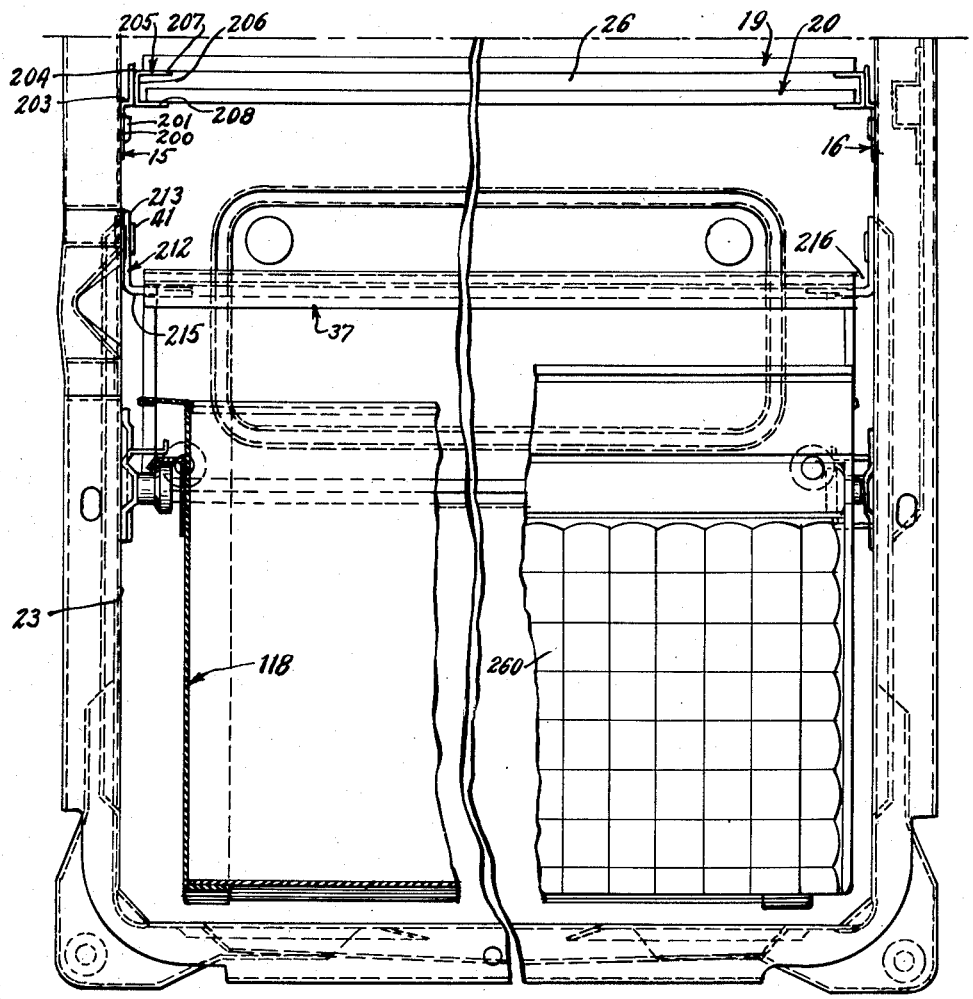
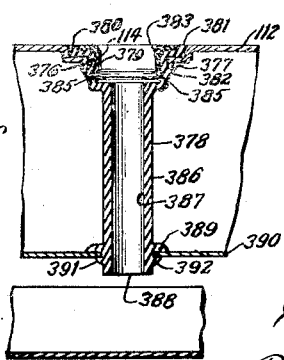

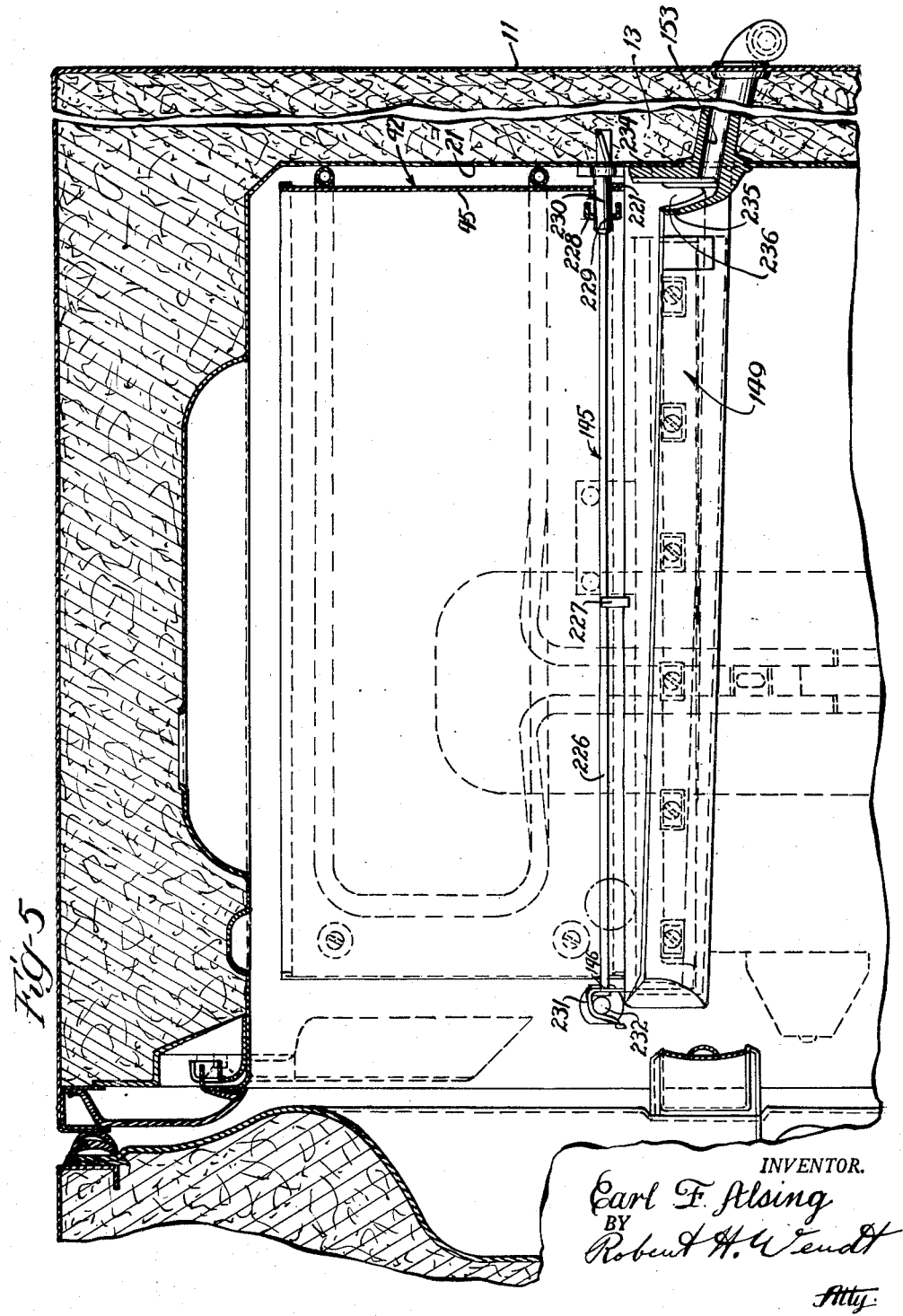

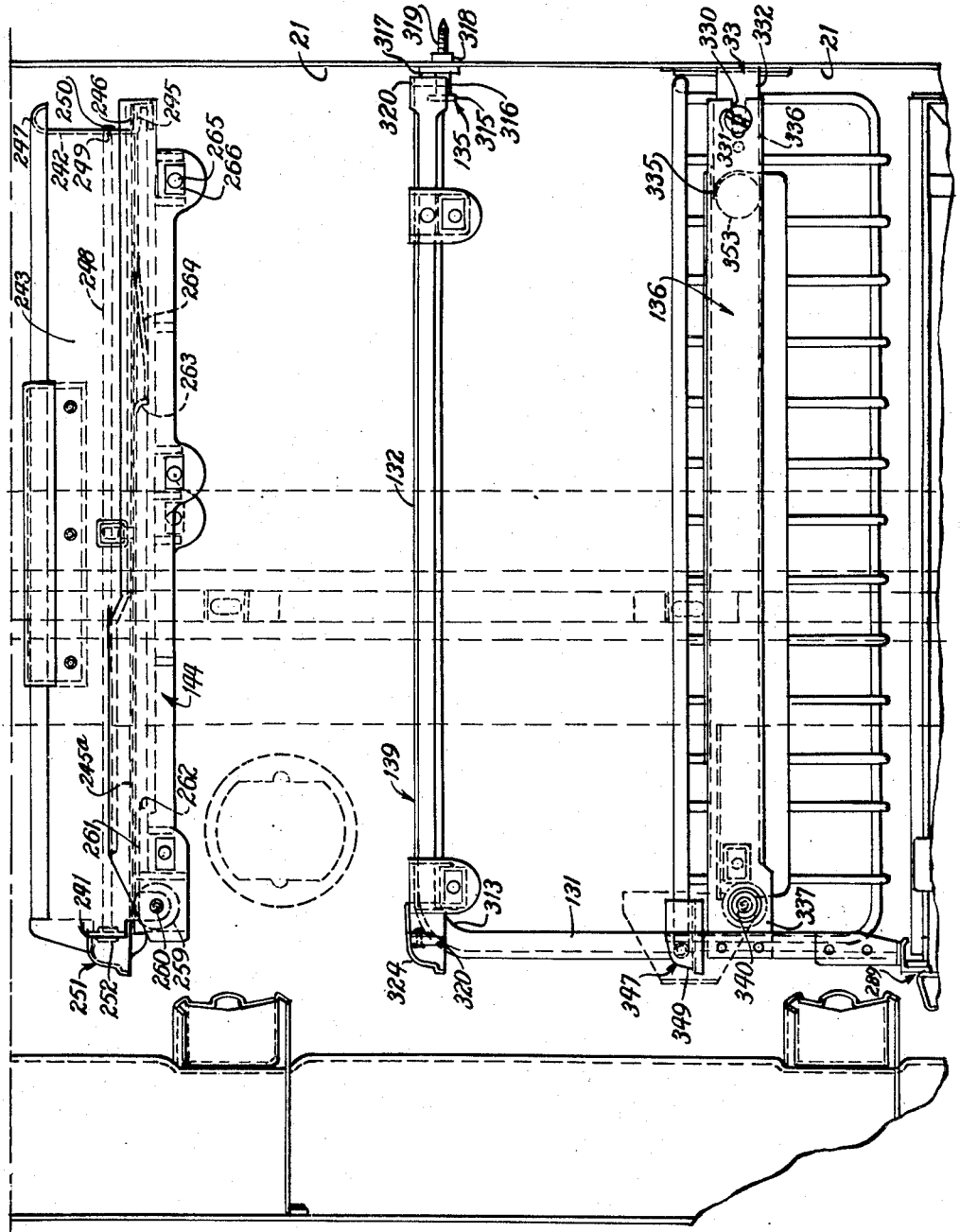

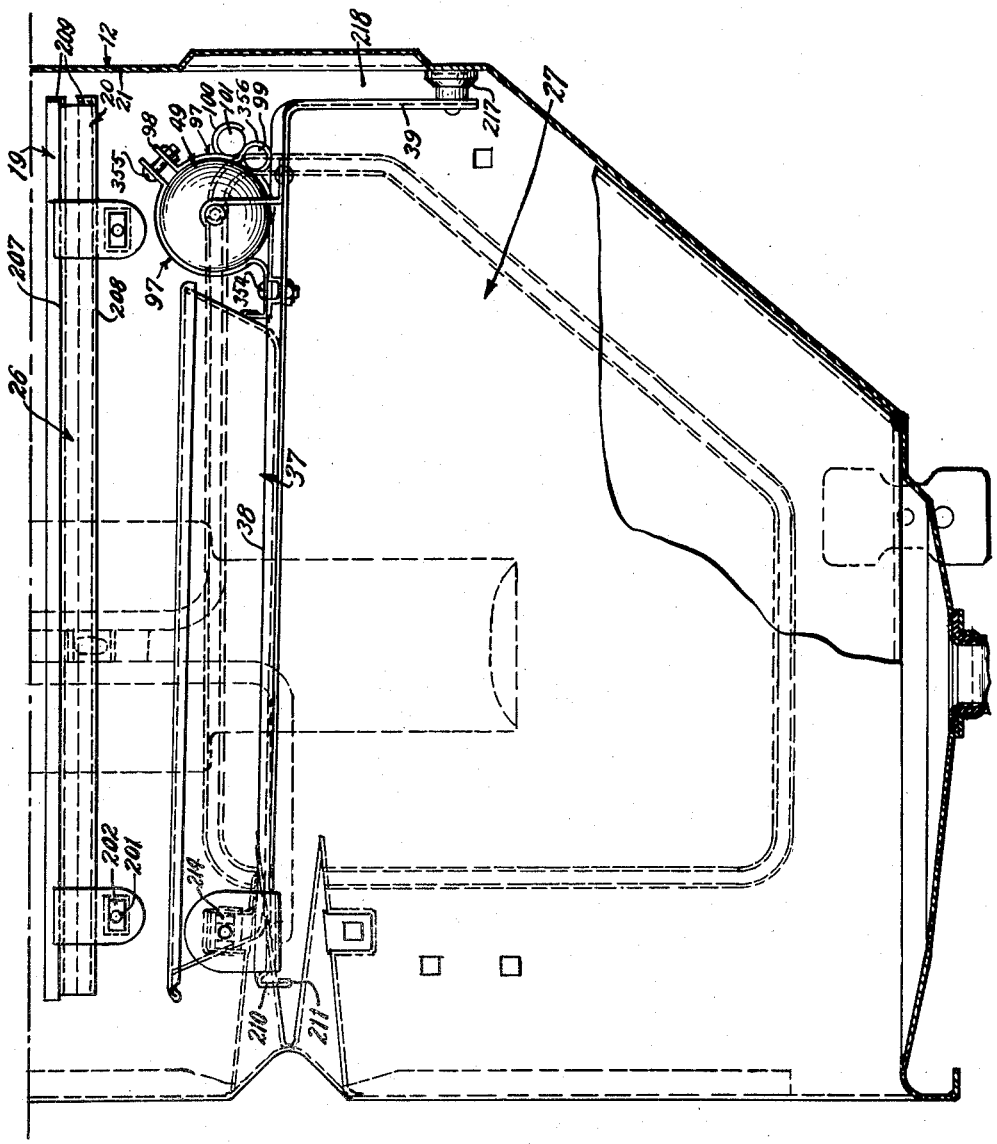

Dec. 28, 1954     C. F. ALSING     2,697,916
MULTIPLE TEMPERATURE HOUSEHOLD REFRIGERATOR
AND METHOD OF REFRIGERATION
Filed June 3, 1953     17 Sheets-Sheet 9

INVENTOR.
Carl F. Alsing
BY
Robert H. Wendt
Atty

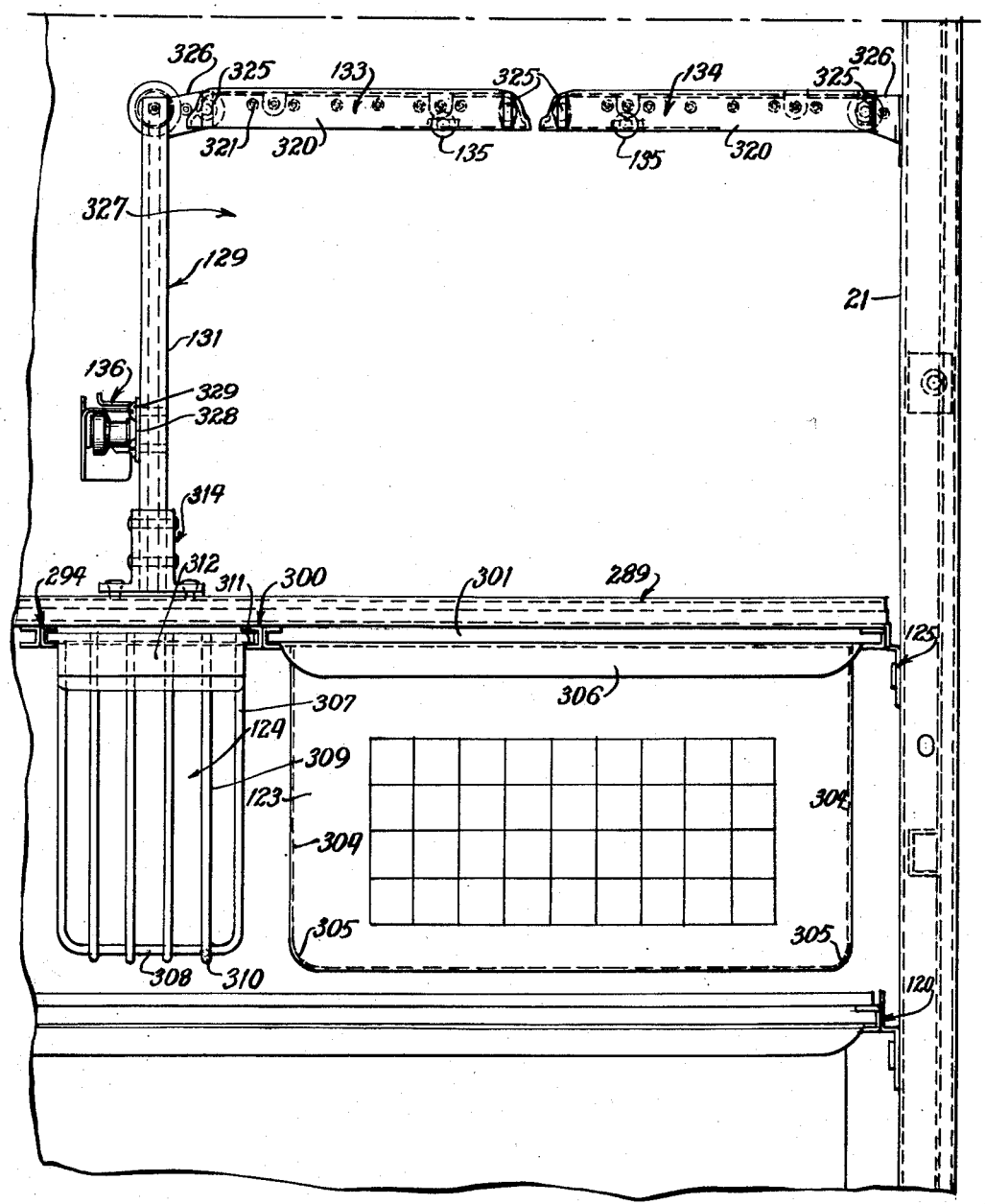

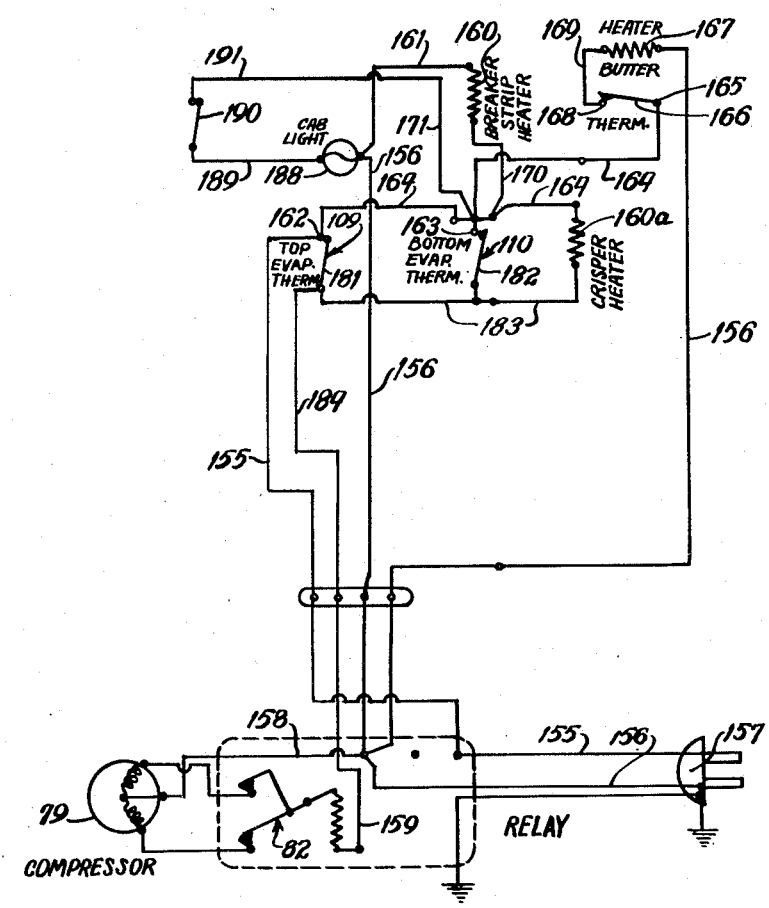

Dec. 28, 1954   C. F. ALSING   2,697,916
MULTIPLE TEMPERATURE HOUSEHOLD REFRIGERATOR
AND METHOD OF REFRIGERATION
Filed June 3, 1953   17 Sheets-Sheet 12
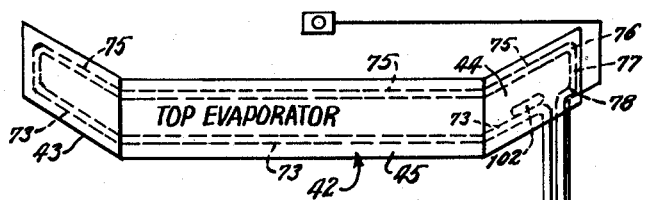
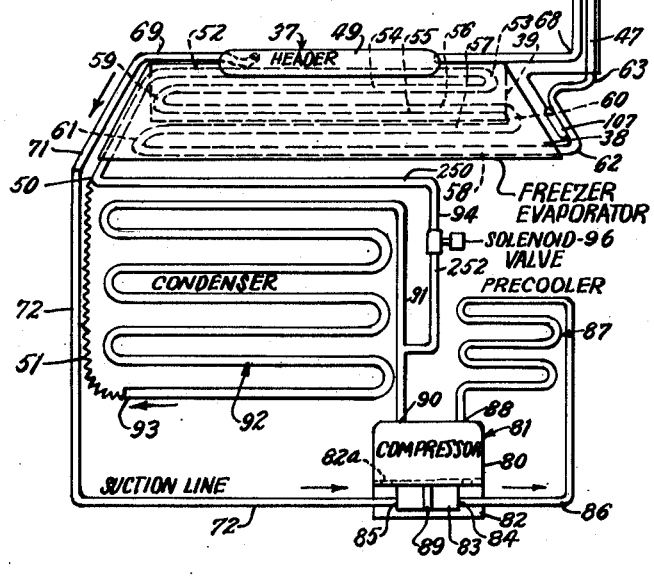
INVENTOR.
Earl F. Alsing
BY
Robert H. Wendt
Atty.

Dec. 28, 1954  
C. F. ALSING  
2,697,916  
MULTIPLE TEMPERATURE HOUSEHOLD REFRIGERATOR  
AND METHOD OF REFRIGERATION  
Filed June 3, 1953  
17 Sheets—Sheet 13

INVENTOR.  
Carl F. Alsing  
BY  
Robert H. Wendt  
Atty.

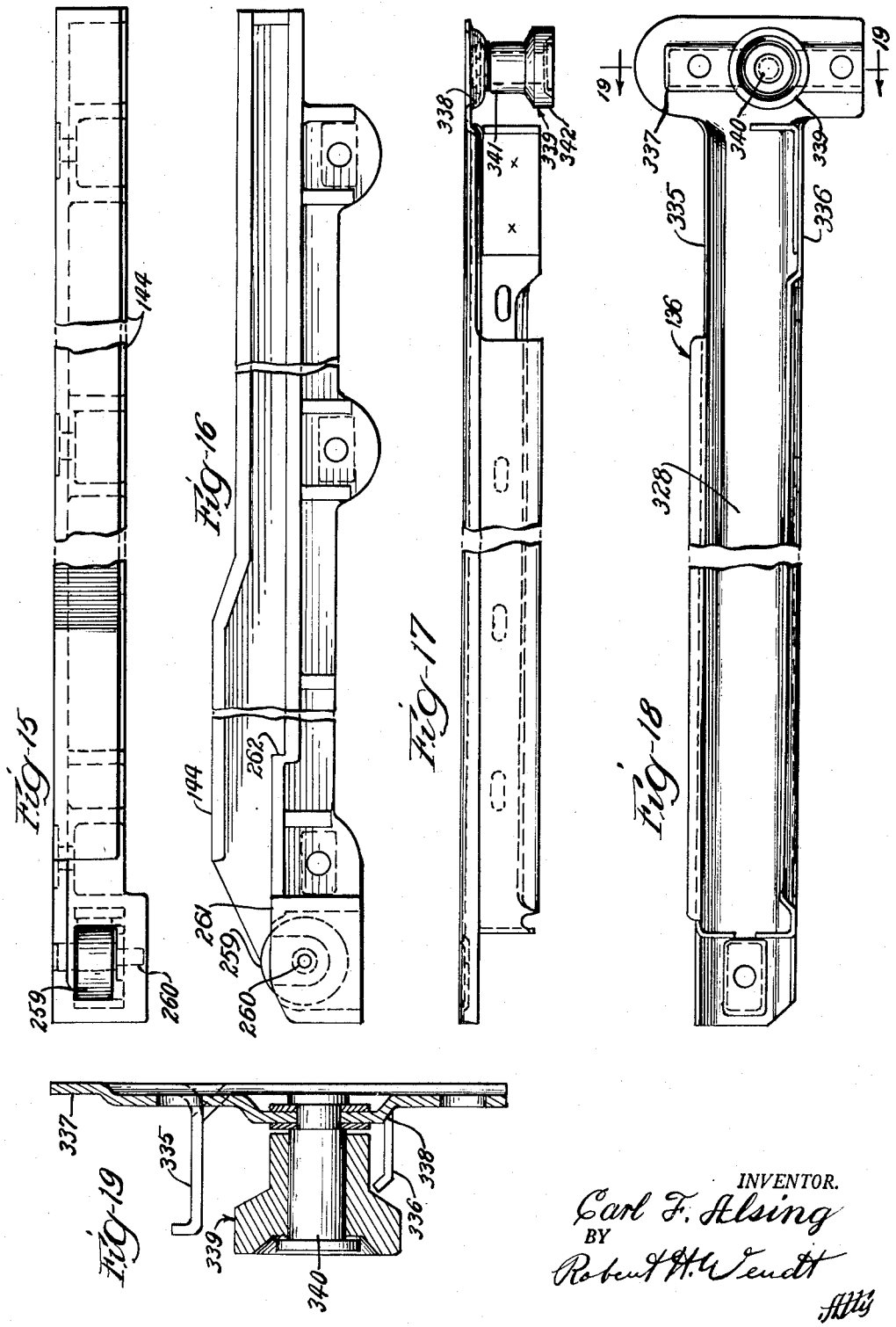

Dec. 28, 1954  C. F. ALSING  2,697,916
MULTIPLE TEMPERATURE HOUSEHOLD REFRIGERATOR
AND METHOD OF REFRIGERATION
Filed June 3, 1953  17 Sheets-Sheet 15
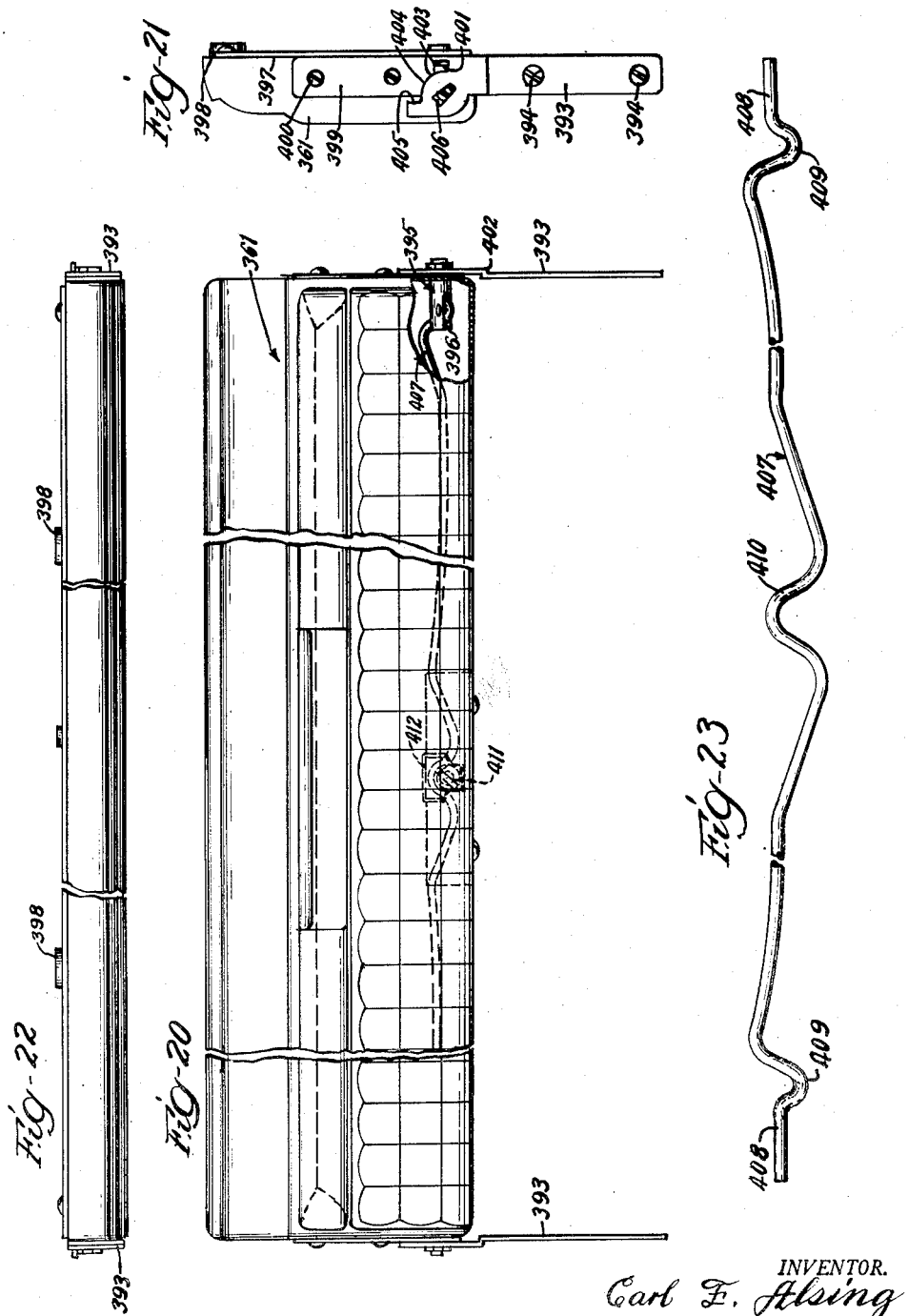
INVENTOR.
Carl F. Alsing
BY
Robert H. Wendt
Atty.

Dec. 28, 1954    C. F. ALSING    2,697,916
MULTIPLE TEMPERATURE HOUSEHOLD REFRIGERATOR
AND METHOD OF REFRIGERATION
Filed June 3, 1953    17 Sheets-Sheet 16
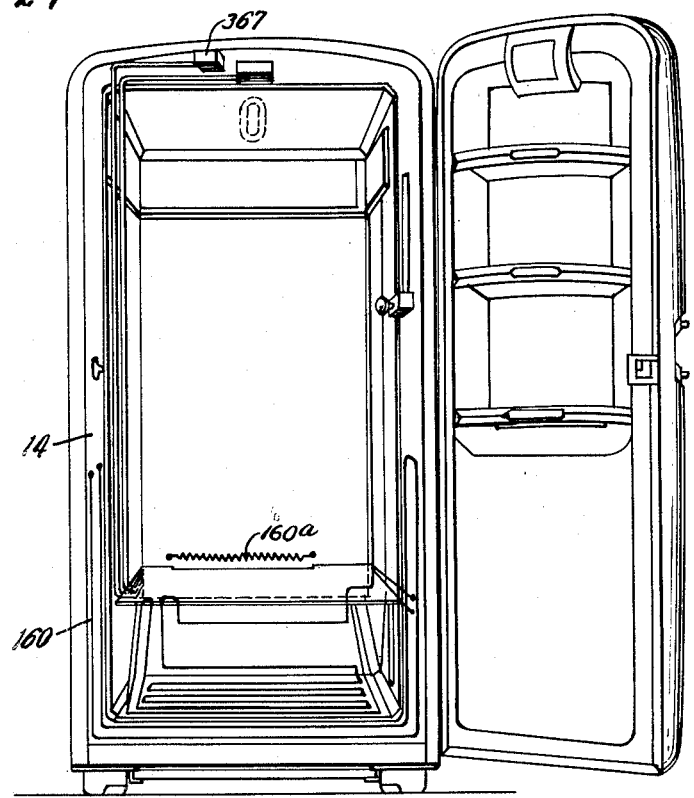
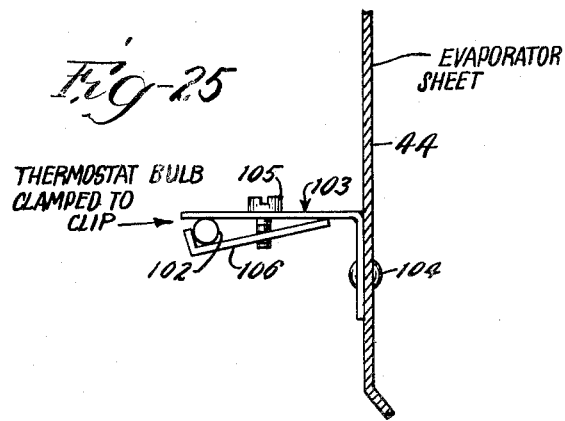
INVENTOR.
Earl F. Alsing
BY
Robert H. Wendt
Atty Dec. 28, 1954 C. F. ALSING 2,697,916
MULTIPLE TEMPERATURE HOUSEHOLD REFRIGERATOR
AND METHOD OF REFRIGERATION
Filed June 3, 1953 17 Sheets-Sheet 17
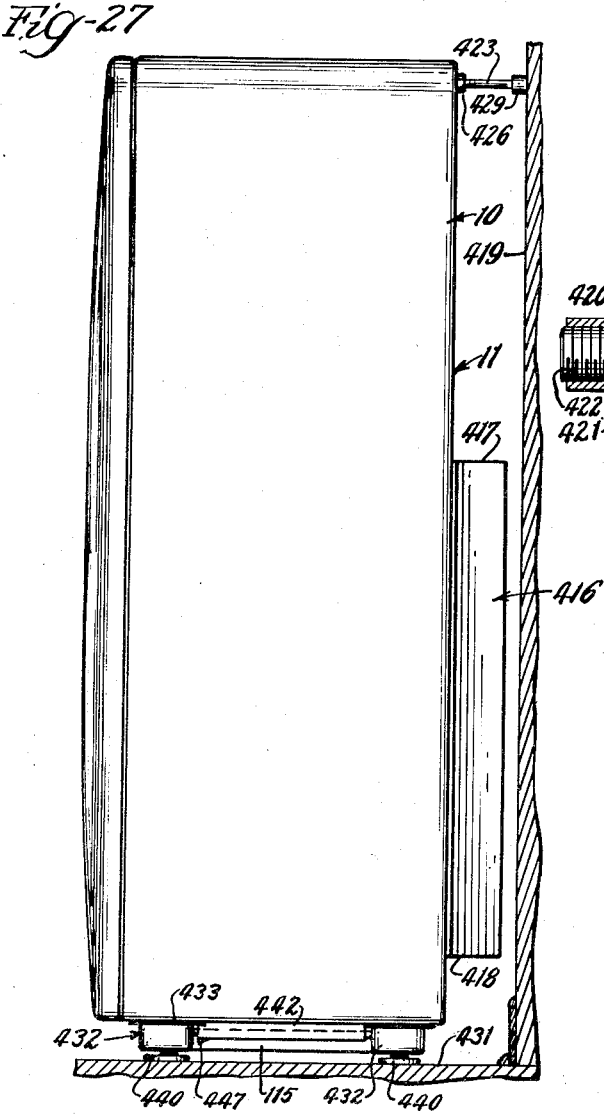
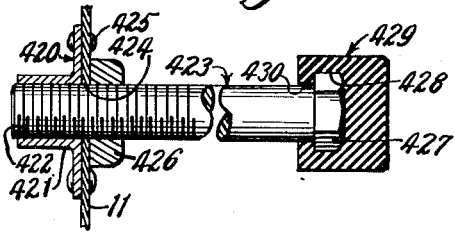
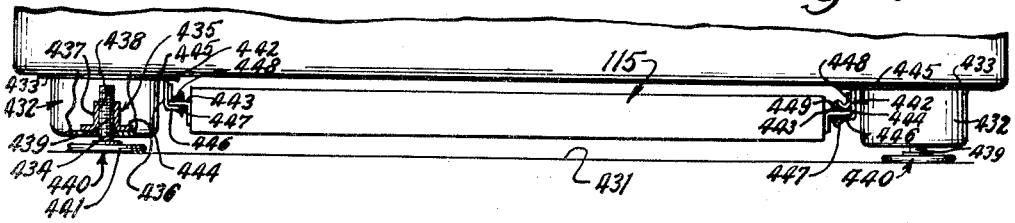
INVENTOR.
Carl F. Alsing
BY
Robert H. Wendt
Atty.

United States Patent Office 2,697,916
Patented Dec. 28, 1954

2,697,916

MULTIPLE TEMPERATURE HOUSEHOLD REFRIGERATOR AND METHOD OF REFRIGERATION

Carl F. Alsing, Evansville, Ind., assignor to Seeger Refrigerator Company, St. Paul, Minn., a corporation of Minnesota Application June 3, 1953, Serial No. 359,287

10 Claims. (Cl. 62—4)

The present invention relates to multiple temperature household refrigerators and methods of refrigeration, and is concerned with improvements over my prior application, Serial No. 272,175, filed February 18, 1952, for Two-Temperature Household Refrigerators.

One of the objects of the invention is the provision of an improved method of refrigeration of an insulated cabinet by means of two separate evaporators located at the bottom and at the top of the cabinet, and cooled at different temperatures and separated by a plurality of insulating barriers, also providing separate food storage spaces so that multiple temperature storage zones may be provided, ranging in temperature from below-zero to the temperatures needed for cooling and storing various types of food at above-freezing temperatures, these zones being located one above another in succession in a temperature gradient which increases from the bottom to the top.

Another object of the invention is the provision of an improved household refrigerator in which storage zones, shelves, drawers and the like are provided for storing all of the different kinds of household foods usually on hand, each at its proper temperature and each arranged so that those to which access is had most often are located upwardly in the cabinet at or just below eye level, or at finger tip height, while the frozen food and ice cubes to which access is had less often are disposed at the bottom of the cabinet where they are less accessible but are most efficiently cooled.

Another object of the invention is the maintenance of multiple different storage temperatures in the same cabinet most efficiently with a minimum number of cooling coils and evaporators, by locating the coldest evaporator at the bottom and the less cold evaporator at the top, and by utilizing intermediate insulating barriers which also provide storage zones of different temperatures in a cabinet in which there is an increasing temperature gradient from the bottom to the top, the said barriers accentuating the temperature difference between zones and also serving as food supports.

Another object of the invention is the provision of an improved refrigeration system for providing multiple temperature zones in a single cabinet by so proportioning the refrigerant charge and the space volume for refrigerant in the system, that the major cooling effect is produced in a below-zero freezing zone by coils which are cooled by liquid refrigerant at one end of the cabinet, and a minor cooling effect is produced by evaporator coils in the other end of the cabinet by means of dry gaseous refrigerant which is left over from the below-zero coils, for cooling the other end of the cabinet and producing intermediate various temperatures between the ends of the cabinet.

Another object of the invention is the provision of the automatic regulation of the cooling effect in the above-freezing zones so that the above-freezing zone temperature will remain substantially constant and above freezing even when the ambient temperature outside the cabinet drops so that there is less heat loss through the cabinet walls and less cooling is required in the above-freezing zone, by utilizing the tendency of lubricating oil to absorb refrigerant in the system to diminish the amount of refrigerant available when less cooling is required, and to proportion the amount of cooling in the above-freezing zone according to ambient temperature.

One of the defects of maintaining a freezing zone at a suitable below-zero temperature while cooling a food storage space to a suitable above-freezing temperature lies in the fact that when the motor compressor is controlled responsive to the temperature and requirements of the below-zero frozen food zone, such a system will result in the overcooling of the above-freezing food storage space whenever the refrigerator is used in a low-temperature ambient.

Another object of the invention is the provision of an improved refrigeration system in which the volume of the high side compressor housing, the amount of oil in the system, the volume of a frozen food evaporator, the volume of an above-freezing evaporator, and the amount of refrigerant charge are so proportioned that the refrigeration can be confined principally to the ice freezing or frozen food storage area during low ambient operating conditions, and so that the refrigeration can be automatically extended to fill the above-freezing evaporator under high ambient conditions.

Another object of the invention is the provision of an improved refrigeration system in which advantage is taken of the tendency of mineral oil to absorb refrigerant, such as "Freon" (F-12) in an amount which varies with temperature, so that as the compressor becomes heated, due to longer running periods under higher temperature ambients, more refrigerant is made available to the system by the fact that the oil liberates the refrigerant at higher temperatures and absorbs more refrigerant at lower temperatures.

Another object of the invention is the provision of an improved refrigeration system provided with an evaporator section used for cooling a frozen food zone and for freezing ice; and a second evaporator section used for cooling a food storage space to above-freezing temperatures, and in which the refrigerant goes first to the frozen food evaporator section, and in which the second evaporator section for cooling the food storage space is provided with a temperature responsive switch for controlling the compressor, and only with sufficient refrigerant to maintain the latter space at a suitable temperature under all ambient room temperatures. A second temperature responsive switch may have its bulb adjacent the first freezing evaporator, and the switches may be connected in parallel so that the demands of both must be satisfied by the compressor.

Another object is the provision of an improved domestic refrigerator of the class described in which the evaporator area under refrigeration may be automatically varied, depending upon the ambient conditions, and in which the evaporator may be provided with an extended area to accumulate frost and to keep the cabinet from becoming excessively wet during high humidity operating conditions.

Another object of the invention is the provision of an improved household refrigerator structure and arrangement in which the refrigerated space extends from the bottom of the cabinet to the top of the cabinet, and in which the lower end of the cabinet is employed for the coldest zone for storing frozen food, next above which is the zone for ice cubes, and thereafter extending upward toward the top of the cabinet the temperature gradually increases, thereby making the cabinet more efficient because of the natural tendency of the upper end of the cabinet to be warmer and of the lower end of the cabinet to be colder; and placing the food storage spaces so that those which are used most frequently are at the most convenient levels in the cabinet.

One of the objects of the present invention is the provision of an improved refrigeration system in which the amount of effective cooling area of the evaporator which is available for cooling the food storage space is automatically varied by the operation of the system in such manner that the freezing enclosure of the evaporator is always kept at a low temperature below freezing; but the food storage space is always kept at a suitable temperature above freezing, even though the ambient temperature under which the household refrigerator operates may vary greatly, as it does, when the same refrigerator is intended to be used in extremely cold climates and extremely hot climates.

Another object of the invention is the provision of an improved refrigeration system which takes advantage of the characteristic of oil of absorbing different amounts of refrigerant, such as Freon, depending upon the temperature and pressure of the mineral oil which is employed for this purpose and for lubricating the compressor, to reduce the effective amount of refrigerant available under different ambient temperatures. The refrigerant employed, commercially known as "Freon" or F12, is technically known as dichlorodifluormethane.

Other objects and advantages of the invention will be apparent from the following description and the accompanying drawings, in which similar characters of reference indicate similar parts through the several views.

Referring to the drawings, of which there are seventeen sheets accompanying the specification, Fig. 1 is a front elevational view of a household refrigerator, shown without the door, and embodying the invention;

Fig. 2 is a vertical sectional view, taken on the plane of the line 2—2 of Fig. 1, and showing the details of construction of the interior of the refrigerator;

Fig. 3 is a fragmentary front elevational view of the refrigerator, showing the inner liner and its contents and accessories from the front, partially broken away down the middle of the cabinet and broken off at the bottom;

Fig. 4 is a similar fragmentary front elevational view of the bottom portion of the inner liner and its contents partially broken away down the middle of the cabinet;

Fig. 5 is a fragmentary vertical sectional view taken on the same plane as Fig. 2, showing the details of construction of the upper end of the cabinet and upper evaporator, shelf and condensate trough;

Fig. 6 is another fragmentary sectional view taken on the same plane showing the details of construction of the next lower part of the cabinet, including the removable tray shelf and the bottle basket and other adjacent parts;

Fig. 7 is a fragmentary sectional view taken on the same plane and showing the details of construction of the next part of the refrigerator below Fig. 6, where the crispers and the meat and beverage drawer are located;

Fig. 8 is a fragmentary vertical sectional view on the same plane showing the details of construction of the lower below-freezing zone, lower evaporator and partition members which separate it from the upper above-freezing zone;

Fig. 10 is a view similar to Fig. 8, showing the right half of the refrigerator at substantially the same level;

Fig. 11 is a wiring diagram of the electrical system employed in the refrigerator;

Fig. 12 is a simplified wiring diagram of the cold control;

Fig. 13 is a diagrammatic illustration of the refrigeration system employed in the refrigerator;

Fig. 15 is a top plan view of one of the guides for the combined tray and shelf;

Fig. 16 is a side elevational view of said guide;

Fig. 17 is a top plan view of one of the guides for the bottle basket, or for the frozen food drawer;

Fig. 18 is a side elevational view of the guide of Fig. 17;

Fig. 19 is a sectional view taken on the plane of the line 19—19 of Fig. 18;

Fig. 20 is a fragmentary front elevational view partially broken away showing the structure of the pivoted door carried by the frozen food drawer for closing the space between the partition members and the lower evaporator, and for giving access to the ice cube trays or other articles above the lower evaporator;

Fig. 21 is a side elevational view of the pivoted door of Fig. 20 taken from the right;

Fig. 22 is a top plan view of the door of Fig. 20;

Fig. 23 is a fragmentary elevational view of the spring employed in the door of Fig. 20;

Fig. 24 is a front elevational view of the cabinet and door with the door open, showing the location of various heaters and controls;

Fig. 25 is a fragmentary elevational view showing the method of attaching the bulb of the cold control to the upper evaporator;

Fig. 26 is a fragmentary vertical sectional view taken on a plane passing through the axis of the liner drain;

Fig. 27 is a side elevational view of a cabinet installation showing the system of levelling and wall support of the cabinet;

Fig. 28 is a fragmentary sectional view of the wall spacer structure taken on an axial plane;

Fig. 29 is a fragmentary side elevational view of the lower part of Fig. 27, on a larger scale partially broken away to show one of the floor levellers.

Figure 9:
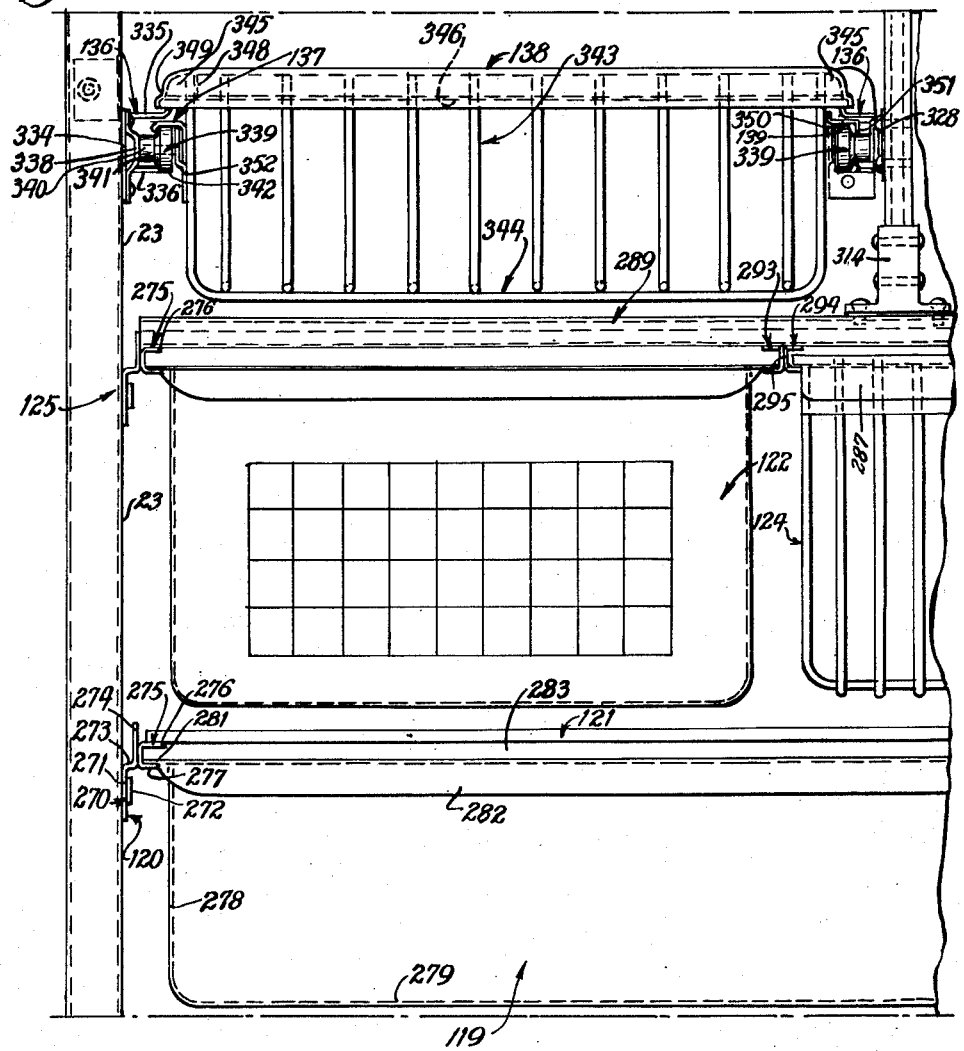
Fig. 9 is a fragmentary elevational view of the left half of the middle of the refrigerator seen from the front with the door removed, and showing the details of structure of the bottle basket, left crisper and egg basket, and meat and beverage drawer.

Referring to Figs. 1 and 2, 10 indicates in its entirety an insulated refrigerator cabinet having an outer shell 11, and an inner liner 12, separated by insulation 13, both the liner and the shell having a door opening at the front or left side, in Fig. 2, where the liner and shell are joined by the usual insulating breaker strips 14.

The liner supports on its side walls a pair of sheet metal guides 15 and 16, each of which has a pair of supporting flanges 17, 18, for supporting a pair of insulating partition members 19, 20, of rectangular shape, which may comprise sheets of glass or suitable insulating plastic.

The insulating partition members 19 and 20 are shown in greater detail in Figs. 4 and 8, Fig. 4 showing a front elevation and Fig. 8 showing an inside elevation.

Each of the guides 15 and 16 has a pair of brackets 200, each of which is provided with a plurality of apertures for receiving the threaded screw bolts 201, which are threaded into spring nuts 202, located on the outside of the liner.

Each of the brackets 200 has an inward offset at 203 and a vertically extending supporting flange 204. The supporting flange 204 supports a U-shaped channeled member 205, which has its attaching yoke 206 welded or riveted to the flange 204, and has the two parallel legs 207 and 208 extending inwardly from the liner wall to support the glass partition members 19 and 20.

At the rear end of each of the guide members 15 or 16, the parallel horizontal flanges 207 and 208 are provided with upwardly turned stop flanges 209 for engaging the partition member and determining its final position slightly spaced from the rear wall 21 of the liner 12.

The partition members 19 and 20 are spaced from each other thereby providing a dead air space 26 between them, and these partition members separate the cabinet into a lower below-freezing space 27 and an upper above-freezing space 28.

The partition members 19 and 20 are sufficiently spaced from the side walls and the back walls of the liner to permit the drainage of condensate, which may be caused by sweating, down the walls of the liner. This space is brought about at the side walls by the offset 203 in the brackets of the guides 15 and 16. At the rear wall the spacing is assured by the stop flanges 209.

For example, the glass partition members may be spaced about one-half inch from the back 21 of the liner 12, Fig. 7. The spacing of the glass partitions 19 and 20 from the side walls 23 and 24 of the liner may be substantially one-fourth inch, as seen in Fig. 4.

The glass partition members 19 and 20 substantially prevent air circulation between the lower below-freezing zone 27 and the upper above-freezing zone 28. The spacing, however, permits the colder lower evaporator to draw moisture by diffusion from the upper zone, causing a greater frosting of the lower evaporator and reducing the humidity of the upper and above-freezing zone of the cabinet.

The glass partition members are also spaced from the rear panel of the door, but the facing of the lower frozen food drawer engages the front of the glass partition members and effects a substantial closure of the lower freezing zone in front.

By reducing the spacing between the partition members and the liner it is found unnecessary to provide resilient gaskets, and the structure of the present partition members is thus made more economical although it is just as effective to act as a partial barrier to the passage of heat from one zone to the other.

The cabinet is provided with a suitable insulated door 29 which is formed by an outer panel 30 and an inner panel 31, separated by insulation 33 and carrying a resilient rubber sealing strip 33, all around the back of the door adjacent its outer edges for engagement with a face flange on the front of the outer shell 11, to effect an air-tight closure of the cabinet.

The door may support a plurality of shelves 34, 35, 36, which are open above and toward the inside for the reception of any articles stored on the shelves.

The lower below-freezing zone 27 is cooled by means of a lower evaporator 37, which includes a horizontal portion 38 and a vertical portion 39 of sheet metal, such as aluminum. The evaporator 37 is preferably arranged to slope toward the back, as shown in Fig. 2, for draining any condensate backwardly, and the evaporator is supported on the back wall of the liner by suitable bolts 40, and on the side wall of the liner by suitable bolts 41.

The evaporator is shown in greater detail in Figs. 4 and 8.

Referring to Fig. 8, the front edge of the evaporator horizontal portion 38 is bent downwardly at 210 to provide it with a face flange which will conceal the evaporator tubing that is secured to the lower side of the evaporator for carrying the refrigerant.

The face flange 210 is provided with a hairpin bend at 211, to eliminate any sharp edge on the face flange 210. The side supporting brackets 212, Fig. 4, are angle brackets which may be riveted or welded to the lower side of the evaporator horizontal portion 38, and have an upwardly extending flange 213 with apertures for passing the bolts 41 which pass through the liner and are threaded into spring nuts 214.

The horizontal flange 215 of the angle brackets 212 is secured to the evaporator in such manner as to permit a lateral spacing 216 between the evaporator and the side walls 23 and 24 of the liner, similar to that provided for the partition members.

The rear vertical portion 39 of the evaporator 37 is spaced from the rear wall 21 of the liner by spacers 217, thus assuring a space 218 between the rear of the evaporator and the liner.

The location of the evaporator 37 in the lower below-freezing zone 27 is preferably spaced from the partition members 19 and 20 sufficient to receive ice trays 219, which may be of different depth than those shown in the drawing, ample spacing being provided for various types of ice trays.

The ice trays may be of any suitable type, preferably comprising aluminum pans with suitable aluminum grids and actuators for effecting a release of the cubes (not shown).

The upper above-freezing zone 28 is provided with an upper evaporator 42, which comprises a rectangular sheet of metal, such as aluminum, which is provided with tubing on its outer side adjacent the liner 12, and is formed with two side wings 43 and 44 extending at right angles from a rear evaporator body 45.

The rear body 45 extends from side to side of the liner while the lateral wings 43 and 44 extend forwardly and backwardly on the sides of the liner at the upper end of the cabinet, and the evaporator has all of its parts spaced from the liner only sufficiently to allow space for the tubing which it carries.

The tubing itself may serve as a spacer, and the details of the upper evaporator installation are shown in Fig. 3, which is a front elevation of the upper part of the liner.

In Fig. 3, it will be seen that the sheet metal wings 43 and 44 and the body 45 of the upper evaporator are provided with a hairpin bend at 220 at the top, being bent outwardly and down against itself to eliminate any sharp edge at this point. The same structure may be used at the lower end of the evaporator at 221.

The side wings 43 and 44 are secured to the liner side walls 23 and 24 by a plurality of screw bolts 222, which are located in countersunk apertures 223 in the wings and extend through the wings and through the liner wall to be engaged with spring nuts 224, clamping the wings and tubing against the liner.

The upper evaporator 42 is disposed at the extreme top of the liner in the above-freezing storage space 28, and is located at what would be the warmest part of the cabinet space for the purpose of assuring the maintenance of all parts of the cabinet at a suitable temperature and providing a gradually increasing temperature gradient from the bottom of the cabinet interior to the top.

The extended area of the sheet of which the wings 43, 44 and body 45 are made provides a surface for gathering frost and reducing the humidity of the upper above-freezing space 28 in the cabinet.

It should be noted that while the upper space or zone 28 is maintained at a temperature above-freezing, the upper evaporator 42, as well as the lower evaporator 37 is maintained at a temperature below 32 degrees F. to eliminate sweating on the evaporators which would result in the formation of ice.

In other words, the evaporators are colder than the space which they cool.

The structure and arrangement of the coils or tubing on the evaporators will be described in detail after the description of the rest of the contents of the cabinet.

The space between the side wings 43, 44 and the liner is closed in each case by a facing member 225 of insulating material, such as a plastic strip, to present a finished appearance from the front of the evaporator.

Immediately below the upper evaporator 42 the cabinet is provided with an upper shelf 145. This shelf may be of the type having front and rear frame members 146, comprising finished metal bars which support a plurality of forwardly and rearwardly extending wires 226, which have their ends upset and riveted into the bars 146.

The structure of the upper evaporator 42 and shelf 145 is shown in greater detail in Fig. 5. The wires 226 of the shelf are also joined and braced by being clamped in partially circular grooves in a transverse bar 227, joining all the wires of the shelf.

The rear frame member 228 of the shelf is shown as being a rearwardly open channel which is provided with a pair of apertures 229, for receiving the supporting pins 230, which pass through the rear wall 45 of the evaporator 42, and are secured in the rear liner wall 21.

The pins are adapted to slide into the apertures 229 to effect a support of the upper shelf 145 at the rear. The front frame member 146 of the shelf is provided with a U-shaped facing member 231, Fig. 5, which is secured by being riveted to certain of the wires 226, and which extends over and downward in front of the pins 232, one of which is carried by each side wall 23, 24, of the liner to support the front end of the shelf.

The shelf having had its rear frame member 228 first secured upon the pins 230, the front of the shelf may have its U-shaped facing member 231 dropped over the pins 232 to secure the shelf in place. Thus the uppermost shelf 145 is located within the confines of the upper evaporator 42.

The lower edge 231 of the upper evaporator 42 is spaced from the side walls of the liner and any frost which gathers upon either side of it runs down to the lower edge 221, which drains into a suitable trough, indicated in its entirety by 149.

The trough 149 has two side wall portions 150 and 151, Fig. 3, and a rear wall portion 152, and all of these trough parts drain toward the back of the liner and across the back toward the middle of the liner, where the trough communicates with a discharge spout 153, which extends through the insulation 13 and through the shell 11, and drains the condensate from the upper evaporator down a pipe which leads to a drain pan 115, located outside the shell below the cabinet and between the feet 233 of the cabinet.

Thus the condensate water which results from defrosting or from any other melting on the upper evaporator 42 is drained down to the evaporation pan 115 where it evaporates due to the passage of air over it.

The trough 149 may be made of a molded plastic of a size and shape adapted to fit inside the liner side walls and back wall; and the trough preferably has a wider attaching flange 234 engaging the liner and a lower inner flange 235 projecting inwardly beyond the lower edge 221 of the evaporator, defining a substantially V-shaped groove 236 inside the trough.

The trough is secured to the liner by means of a plurality of screw bolts 237 which hold upwardly extending metal clips 238 on the side walls. The clips 238 are provided with an inwardly offset flange 239 which fits in a complementary groove extending upwardly into the rear wall 234 of the trough.

In other words, the outside of the trough has a depending flange 240 which slides downward behind the offset portion 239 of each clip, automatically securing the trough to the side walls of the liner and to the rear wall at the point where the bolts 237 and clips 238 are shown.

Various types of shelves may be employed in the cabinet, but the next type of shelf preferably employed is indicated at 140, and this is of the type comprising a combined shelf and serving tray capable of being removed from the cabinet with its contents intact for serving cooled food, such as desserts, salads or the like, by placing the tray on the table.

The shelf 140 is preferably provided with front and rear frame members 241, 242, Fig. 6. The rear frame member 242 may comprise a rectangular strip of sheet metal which also extends forwardly at 243 and 244 on both sides, and it may be provided with a rearwardly extending flange 245, which is bent back on itself at 246. A lower flange 245a slides in the guides 144.

The upper edge of the rear frame member 242 and sides 243, 244, may be provided with a partially cylindrical outward and downward bend at 247, thus making this frame member 242—244 channeled in shape and opened outwardly.

The frame members 241, 242 are joined by a multiplicity of forwardly and rearwardly extending wires 248, each of which is upset at 249, inside the frame members, and riveted over at 250 on the outside, fixedly securing the wires to the front and rear frame members.

A front facing flange 251 may be carried by the front frame member 241, and the frame member 241 is substantially U-shaped, curving downwardly to cover the riveted ends of the wires 248, to which its rear flange is secured.

The outwardly projecting, half cylindrical curve 247, at the top of the side frame members 243, 244, serves as a handle grip into which the fingers may be inserted from below on three sides of the tray, but the tray is preferably provided with auxiliary handles 142 on each of its sides. These may comprise molded members having an attaching flange 253, an easy bend at 254, a top wall 255, a downwardly extending flange 256, and an inwardly extending flange 257 embracing the curved portion 247.

In order to provide the shelf with a smooth sliding action the side frame members 243 and 244 are mounted on guides 144, carried by the liner side walls. (See Figs. 15, 16).

Guides 144 comprise elongated molded plastic members, each of which is provided with a roller 259, pivotally mounted by a pin 260, near the front edge of each guide and projecting sufficiently from the upper surface of each guide to engage the side frame members 243, 244.

The upper surface of guide 144, near its forward end, is indicated at 261, just slightly lower than the roller, but there is a transverse shoulder 262 in each guide spaced slightly from the front and adapted to engage a metal stop 263.

The stop member 263 permits the shelf to be slid forwardly until stop 263 engages shoulder 262, after which the shelf must be tilted upwardly at its forward edge to clear the stop 262 and permit the shelf-tray to be removed from its guides.

On its rear side the stop member 263 slopes diagonally upward at 264 to slide over the shoulders 262 as the shelf is inserted. The guides are secured to the side walls by means of a plurality of bolts 265 and metal clips 266 in fixed relation with respect to the liner. Thus the combined shelf and tray 140 is slidably mounted on its guides, but it may be moved forward on its guides and lifted from the guides to be carried to the table with its contents intact.

For resting on the table, it is provided with a plurality of rubber feet 143.

The combined tray and shelf 140 is thus adapted to be rolled out until it engages its stops and thereafter, if desired, it may be lifted and freed from its guides by tilting the forward end up slightly so that it may be carried to a table or other place and used for service of its contents.

Referring to Figs. 1 and 2, immediately above the partition members 19 and 20 the cabinet is preferably provided with the meat pan 119, which is slidably mounted upon guides 120, carried by the liner walls 23 and 24, and provided with a glass cover 121 supported by flanges on the same guides.

The meat pan 119 may extend from side to side of the liner, is made relatively shallow, and is preferably constructed of porcelain covered steel; and the structure of the pan and its guides is shown in greater detail in Figs. 9 and 10 on a larger scale.

Each of the guides 120 is provided with a pair of sheet metal brackets 270, having attaching flange 271, which may be secured to the liner wall by means of self-tapping screw bolts 272. Each bracket has an inward offset at 273 and a guide supporting flange 274 which supports a channeled member 275.

The channeled member 275 is substantially U-shaped except that its upper flange 276 is slightly wider and it extends from front to back in the cabinet and supports the glass cover or shelf 121.

The lower flange of the channel 275 is indicated at 277, and it extends from front to back of the cabinet for supporting the meat pan 119. The meat pan 119 may be substantially rectangular in plan, is provided with two side walls 278, a bottom wall 279, and front and back walls 280.

The side walls 278 carry an integral laterally projecting supporting flange 281, which is received in the channel 275 and rests on the flange 277 of the guide. The front wall 280 of the meat pan is provided with a forwardly and downwardly extending flange 282, serving as a handle.

The right side of the meat pan is mounted on a similar guide 120, having similar parts arranged to project inwardly from the right side. The glass cover 121 is spaced from the upper edge of the meat pan by a spacing indicated at 283, which is open at the front and back but is closed at the sides by the channels 275.

The offset 273 at the sides in the supporting brackets 279 provides about ¼ inch spacing for permitting drainage down the side walls of the liner and permitting moisture in the air to move by diffusion to the colder lower evaporator, preventing excessive humidity in the upper food storage space 28.

The meat pan is spaced from the rear wall by upwardly turned ends of the flanges 277, and the glass cover 121 is spaced from the rear wall by upwardly turned ends of the flanges 276.

Immediately above the meat pan 119 and its cover 121 the cabinet is provided with a pair of crisper drawers 122 and 123, slidably mounted upon guides 125 and having the egg basket 124, also slidably mounted and disposed between the crisper drawers, as shown in Figs. 1 and 2.

The drawers 122, 123 are provided on their front edge with a facing plate 128, which is separated into three parts at 284, 285, but has the same cross-sectional shape, and the parts present the same appearance from the front.

Thus the three facing plates are indicated at 286 on the left crisper drawer 122; 287 on the egg basket 124; and 288 on the right crisper drawer 123.

The details of structure of these drawers and guides are shown on a larger scale on Figs. 7, 9 and 10. Each side wall of the liner 23 and 24 supports guides 125, which are substantially the same in structure as the guides 120 for the meat drawer, and the same numerals have been applied to corresponding parts of these guides in Figs. 9 and 10.

The upper flange 276 of each channeled member 275 of the guides 125 is provided with a front shelf frame member 289, which extends from side to side of the liner and may be angular in shape having a horizontal flange 290 and a vertical flange 291, as shown in Fig. 7.

Flange 276 of the channel 275 has an upwardly turned end 292 for supporting this front shelf frame member, which provides support at the front for a pair of channeled members 293 and 294, Figure 9, serving as guides for slidably mounting the right edge of the left crisper drawer 122 and for slidably mounting the left edge of the egg basket 124.

The channeled members 293, 294 may be identical except the flanges of 293 are wider and they extend from front to back of the cabinet and are secured together back to back at their yokes 295, with their legs extending horizontally as guide flanges and supporting flanges.

At the rear end of the cabinet the liner carries supporting pins 296, which carries a vertically extending frame strip 297 and an angular frame strip 298, provided with a horizontal flange 299 extending under the glass cover 127 and determining its spacing from the rear liner wall 21.

Thus the lateral guides 125 and their channels combine with the front frame member 289 and the rear frame member 298 to provide a rectangular frame, which is provided between the side walls of the cabinet with the additional guides 294 and 300 that are identical in construction for supporting the upper edges of the egg basket 124 and inner edges of the crisper drawers 122 and 123.

The frame also supports the glass cover 127 which is slightly spaced from the upper edges of the crisper drawers, the spacing being indicated at 301. The crisper drawers may be identical in construction and each may consist of a sheet metal box-like drawer having front and rear walls 302, bottom wall 303, and side walls 304, these walls being joined at rounded corners 305, formed with an easy bend; and the entire drawers being covered with porcelain enamel or other suitable finish.

At its forward edge each crisper pan is provided with a sheet metal handle member 306, which is attached to the upper front edge of the drawer and depends to provide a groove into which the fingers may be inserted to withdraw the drawer.

The egg basket 124 is formed of steel wire suitably coated to resist corrosion and to present a clean appearance, and comprises a multiplicity of U-shaped wires 307, having vertical legs which provide side wires and a horizontal yoke 308 which provides bottom wires.

The egg basket also includes front and rear U-shaped wire members 309, the legs of which extend vertically on the front and the back, and the yoke 310 of which is secured to the transverse yoke wires 308.

The basket is bordered at the top by a guide member 311, projecting laterally from each upper edge and slidably mounted in the guides 294 and 300 which have stops at their rear ends. At its front each basket is provided with a forwardly projecting and depending handle flange 287, by means of which the basket may be pulled out for access to its contents.

The crisper drawers 122, 123 and egg basket 124 are thus spaced from the side walls and rear wall and spaced from the glass cover 121 below them and from the rear panel of the door. The cover 127 for these drawers extends from wall to wall but has the same spacing from side walls and rear wall as the partition members 19 and 20.

Immediately above the crisper drawers, egg basket and their cover, the cabinet is provided with an intermediate framework 129 for supporting the pivoted shelves 133, 134, and for slidably supporting the bottle basket 138.

These parts are shown in greater detail and on a larger scale in Figs. 6, 8, 9 and 10. The framework 129 includes a vertical column 131, which is bent backward at 313 and provided with a horizontal portion 132.

The column 131 is provided at its bottom with a T-shaped supporting bracket 314, which may be secured to the front shelf frame member 289 by rivets or other securing means and which is also secured to the vertical column 131.

The rear end of the horizontal portion 132 may be secured to the rear wall 21 of the liner; and the rear wall of the liner may be provided with a pair of supporting studs 135 (Fig. 1) for supporting the two pivoted shelves 133, 134 from the rear wall of the liner.

One of the studs 135 is shown in Fig. 6; and it comprises a threaded member provided with a head 315, a cylindrical shank 316, an inner nut 317, and an outer nut 318, located on the threaded portion 319.

The studs 135 are located as shown in Fig. 1 in position to engage the shelves 133, 134 and hold them in horizontal position. Each of the shelves comprises a metal member having a frame comprising front and rear portions 320, joined by a plurality of wires 321 upset and riveted in the end frame portion 320.

The sides of the shelves 133, 134 include side frame portions 325; and the front edge of each shelf is finished with a sheet metal facing member 324 which extends over the top front frame members 320 and down in front of each shelf to provide a finished appearance.

Each of the outer frame members 325 may be round and is rotatably and slidably mounted upon brackets 326, so that the shelves may be slid forward out of engagement with the studs 135 and rotated downward to provide a fully open space at 327 for storing a large fowl, ham, roast, watermelon, or other large articles.

Brackets 326, on the right, are mounted on the liner wall 21 and have circular apertures for receiving the rounded portion 325, and the brackets 326, on the left, are mounted on the horizontal portion 132 of the framework 129 and have rounded apertures for receiving the rounded portion 325.

The vertical column 131 supports a guide 136, Fig. 9, and a similar guide 136 of the left-hand type is supported on the liner wall 23, Fig. 8. Guides 136 comprise channeled members having their open side extending inward. The right guide 136 has a yoke 328 which is fixedly secured by rivets 329 to the vertical column 131.

At its rear end, that is, the right of Fig. 6, the right guide 136 has a slot 330 engaging a screw bolt 331, which is threaded into the horizontally extending arm 332 of a bracket 333, which is carried by the rear liner wall 21.

In a similar manner the left guide 136 has its yoke 334 secured to the liner wall 23 by suitable screw bolts and nuts at both the front and rear ends. The guides 136 each have an upper flange 335 and a lower flange 336 extending from front to back for guiding and supporting the bottle basket 138.

Each of the guides 136 is provided adjacent its front end with a flattened end portion 337, Fig. 6, which is formed with a pressed cup-shaped member 338, Fig. 8, for supporting a molded plastic roller 339, carried by a stud 340, riveted into said cup-shaped formation and having a head on the inner end of said rollers.

Each roller 339 has a smaller cylindrical portion 341 and a larger cylindrical head 342 acting as the engaging part of the roller for supporting the bottle basket 138. The rollers are preferably made of the plastic which is self-lubricating and sold in the open market under the name of "nylon."

Rollers 339 are adapted to support the front end of the bottle basket 138, which is provided with tracks 137, 139, resting on the rollers and located below the upper guide flanges 335 of the guides 136.

The bottle basket 138 may comprise a multiplicity of regularly spaced steel wires 343 which extend from front to rear, and upwardly and downwardly on the front and back, these wires being of substantially U-shape, upwardly open.

The bottle basket also includes a plurality of laterally extending wires 344 of substantially U-shape extending laterally across the bottom and upwardly on both sides and being welded to all of the lower front to rear extending wires 343.

The upper ends of the wires 344 on the lateral sides are joined by a front to rear extending wire frame member 345 on each side, and the upper ends of the front to rear extending wires 343 are joined by a laterally extending wire frame member 346.

These upper frame members 345, 346 may comprise an integral piece of wire bent to a rectangle and welded to all of the upper ends of the wires 343, 344.

The front top frame member 346 of the bottle basket 138 is preferably covered by means of a combined facing and handle member 347, which is of substantially U-shape and made of sheet metal with a depending inner flange 348 that engages the inside of the wires 343 and extends backwardly to engage the inside of wires 344 on each side of the basket to which it is welded.

The outer flange 349 of the handle member 347 projects forwardly and downwardly from the basket about the wire frame member 345 and serves as a handle for receiving the fingers on its lower side. The basket wires may be welded to each other at each intersection and galvanized over all.

The upwardly extending legs of the wires 344 support the tracks 137 and 139 which are carried by the bottle basket 138. Each of these tracks includes a horizontally extending upper flange 350 having a depending edge 351. The flange 350 engages above the rollers 339, and the depending edge 351 engages outside the larger portion 342 of the rollers 339. The tracks 137, 139 have a vertical attaching flange 352 which is secured to the vertical lateral wires of the basket 138; and at its rear end each of the tracks 137, 139, Fig. 6, carries another roller 353 which has its rim resting on the lower flange 336 of each guide, but is also adapted to have its upper rim engaging the upper flange 335 of each guide as the bottle basket 138 is pulled forward.

All of the details of the rollers 353 and their support on the tracks 137, 139 may be substantially the same as described with respect to the rollers 339.

Thus the bottle basket 138 is roller supported on its guides and tracks from the left liner wall 23 and from the right framework 129; and the bottom of the basket 138 is spaced from the combined shelf and serving tray 140 sufficiently to make room for the longest bottles that are apt to be stored, such as large beverage bottles, milk bottles, and the like.

Referring to the lower part of Figs. 1 and 2, the below-freezing zone is located below the partition members 19 and 20 and indicated at 27, this zone containing the lower evaporator 37.

The lower evaporator includes sinuous tubing on its lower side, further to be described, and a horizontal pass on its rear apron 39, and is provided with the receiver 49 extending across its horizontal portion 38 near the rear edge.

The receiver 49 comprises an enlarged tubular member having both of its ends spun down to a tubular formation, and the receiver may be secured to the evaporator plate 38 by a pair of clamping members 97, which are curved to extend about the receiver 49, and have their ends secured to the plate 38 by means of screw bolts 354.

Two such clamping assemblies are provided, and the other ends of the clamping members 97 extend radially at 98 and are secured and clamped together by clamping screw bolts 355.

The receiver 49 may have welded to it a cylindrical clamping flange 100 which clamps an electrical heater 101 of the type comprising a copper or aluminum tube enclosing an insulating powder surrounding an electric heating element.

One of the bands 98 may have a projecting, partially cylindrical formation 356 for clamping a plastic covered fuse for a safety cut-out, whenever the temperature of the receiver reaches a predetermind amount.

The side walls 23 and 24 of the liner are provided with guides 357, having rollers 117 for supporting a lower frozen food container; and the guides and rollers 357, 117 may be substantially similar to those described for the bottle basket 138.

The guides for the frozen food drawer 118 carried by the side walls of the liner and the side walls of the drawer preferably overlap each other, as shown at the left of Fig. 4 at the top of the drawer 118 to protect the rollers against drippage and the formation of ice, which would otherwise freeze the drawer in place.

The frozen food drawer 118 conforms substantially in shape to the diagonal portion 113 of the liner at 358, and has a horizontal bottom 359 spaced from the bottom 112 of the liner. The frozen food drawer may be a basket or a sheet metal drawer, and is provided with a front facing 360, substantially closing the space below the evaporator 37.

At its upper edge the frozen food drawer 118 has a pivoted door 361, which is spring pressed to the vertical position, and which engages the partition members 19 and 20 to effect a substantial closure of the space above the evaporator 37.

Referring to Fig. 13, this is a diagrammatic illustration of the refrigeration system including the upper evaporator 42 and the lower evaporator 37. The upper evaporator 42 has its lateral wings indicated at 43, 44, and its rear body at 45. The lower evaporator 37 has its horizontal portion indicated at 38 and its rear depending portion indicated at 39.

The inlet to the lower evaporator is indicated at 50, where the capillary tube restrictor 51 leads to a tube extending backwardly in Fig. 13, to a horizontal pass 52, which is carried by the depending plate 39.

At 53 the lower evaporator tube is bent upward and then extends across the bottom of the horizontal plate 38, with a plurality of sinuous passes 54, 55, 56, 57, and 58. These are joined by U-shaped bends 59, 60, 61.

These sinuous formations are secured to the lower side of the horizontal plate 38 and extend to the right end of the plate, where the tubing is bent backward at 62, and the outlet from the lower evaporator tubing is at 62.

From 63 the tubing extends upwardly at 47 to carry refrigerant to the upper evaporator 42. On the upper evaporator the tubing is curved forwardly at 78 and upwardly at 77, extending adjacent the front edge of the wing 44.

At 76 the tubing curves backwardly on the wing 44, adjacent its top edge and has a horizontal pass 75 extending transversely of the cabinet adjacent the upper edge of the rear body 45 of the upper evaporator, and this pass extends forwardly on the wing 43.

The tubing extends downwardly on the left wing 43, adjacent its front edge and backwardly on this wing, having a horizontal pass 73 which extends backwardly on the wing 43, across the body 45 and forwardly on the wing 44 of the upper evaporator.

Bulb 107 is located on the lower evaporator 37 adjacent its outlet 62.

A bulb 102 of a thermostatic switch 109 is secured to the upper evaporator 42 on its wing 44, adjacent the outlet of the horizontal pass 73. Thus bulbs 107 and 102 are each positioned adjacent the outlet of the evaporator tubing on the evaporator to which they relate.

The tubing extends downwardly from the upper evaporator at 48 to the lower evaporator, where it is bent laterally at 68 and extends into the right end of the receiver or header 49. The outlet from the header is indicated at the upwardly turned end 70 of the tube 69, extending into the other end of the header 49.

Suction tube 69 extends forwardly at 71 and downwardly at 72 to the inlet 85 of a motor compressor 81.

The system includes a motor compressor 81, having a motor 79 in a motor housing 80, and the motor is directly connected to a compressor 83, located in an oil sump 82 attached to the motor housing 80.

The compressor 83 is immersed in a supply of oil in the oil sump 82 and has a central oil inlet conduit 89 for lubrication of the compressor and the motor and communicating with the inlet 85 of the compressor.

The suction line 72 extends to the compressor inlet 85 and passes through the oil sump housing 82 without communicating with the oil sump. The compressor outlet is indicated at 84 and communicates with a tube 86, which also passes from the compressor through the oil sump 82 without communicating with the oil sump. A check valve is located at 85 at the inlet of the compressor, for the purpose of preventing leakage backward from the compressor to the evaporator during the off cycle of the compressor.

The condenser structure may be as shown in application Ser. No. 294,091 of Harry Nadler, filed June 17, 1952, which is incorporated by reference.

The outlet tube 86 from the compressor extends to the upper part of the coils of a precooler condenser 87, the coils of which may be sinuously arranged and extend downward, and are sufficient in length and provided with fins or wires having sufficient radiation surface so that the compressed refrigerant is partially liquefied, the oil and refrigerant entering the motor housing 80 at 88.

The oil runs down on the motor parts inside the housing 80 and the partially condensed refrigerant also runs down and is revaporized to cool the motor. The oil finds its way to the oil sump through apertures 82a in the partition between the oil sump and the motor housing.

The refrigerant vapor is conducted from the upper part of the motor housing 80 at its outlet 90, and is carried by tube 91 to the upper tubing of a main condenser 92, which preferably has its tubing sinuously arranged and extending downward to its outlet at 93.

The main condenser has suitable fins or wires welded to it and these are sufficient in area to dissipate the heat to the ambient atmosphere to fully condense the compressed refrigerant vapor coming from the top of the motor housing 80.

The outlet of the main condenser 92 is connected to a capillary tube restrictor 51, which is soldered to the suction tube 72 for heat exchange with the cool refrigerant returning in the suction tube 72; and the other end of the capillary tube 51 is connected to the lower evaporator inlet at 50.

94 indicates a by-pass tube by-passing the main condenser and capillary restrictor and containing a solenoid valve 96 between its portions 250 and 252 for the purpose of utilizing hot gas from the compressor for defrosting the evaporator, and is the subject of a separate application on the defrosting system. The solenoid valve 96 is normally closed, except during defrosting operations.

Referring to Fig. 12, this is a simplified wiring diagram of the cold controls for controlling the operation of the motor compressor 79 and for maintaining an above freezing temperature in the upper storage space 28 and a below freezing temperature in the below freezing zone 27.

The bulb 102 attached to the upper evaporator 42 has a capillary tube 363 extending to a bellows 364, which controls a thermostatic switch 109 (Fig. 12). The thermostatic switch 109 is in parallel with thermostatic switch 110 for controlling the motor compressor 79.

The bulb 107 has a capillary tube 364 extending to bellows 366, which controls the thermostatic switch 110 (Fig. 12).

Referring to Fig. 25, this figure shows the manner of securing the bulb 102 to the evaporator wing 44 of the upper evaporator 42. A metal angle bracket 103 is riveted to the upper evaporator wing 44 by rivet 104 and has its other flange provided with a bore for passing the screw bolt 105.

Screw bolt 105 is threaded into a bore in the angular clip 106, which engages the bulb 102 and holds it in heat conducting engagement with the bracket 103. The conductivity of the clip or angle bracket 103 is such that the bulb 102 is warmer than the evaporator 42; and its temperature is controlled both bv the evaporator 42 and the air in the upper compartment adjacent the bulb 102.

The temperature of the bulb 102 is controlled to a large extent by the cabinet air temperature. The other bulb 107 is secured to the evaporator plate 38 adjacent the outlet 67 from the lower evaporator tubing; and the temperature of bulb 107 is controlled by the temperature of the lower evaporator tubing at its outlet, thus assuring full refrigeration of the lower evaporator.

Both of the thermostatic switches 109 and 110 are provided with suitable adjustments for determining the temperature at which the bellows will open the contacts and at which the bellows will close the contacts. The temperature control for the switch 110 for the lower evaporator is disposed at 367 (Fig. 24) in the upper part of the cabinet behind the breaker strip and is adjusted at the factory.

The cold control or adjustment for the temperature of the thermostatic switch 109 may be disposed on the right side wall 24 of the liner adjacent the front.

Referring to Fig. 11, this is a wiring diagram of the electrical system for the present refrigerator. In this diagram 79 indicates the motor compressor, which is provided with an induction motor having one common conductor 158 extending from its windings and the other two terminals are controlled by a thermal overload switch 82 connected to conductor 159.

The wall plug is indicated at 157, carrying two conductors 155 and 156 to be energized by the 110 volt 60 cycle lighting circuit. The conductor 156 extends upwardly in the diagram and is the common conductor communicating with conductor 158 of the compressor.

Conductor 155 also extends upwardly in the diagram and is connected to the contact 162 of the upper evaporator switch 109 and connected by conductor 164 to the contact 163 of the thermostatic switch 110 controlled by the lower evaporator. Contact arm 181 of switch 109 is connected by conductor 184 to conductor 159 from the motor compressor and contact arm 181 is also connected by conductor 183 to the contact arm 182 of the other switch 110.

A parallel circuit including conductor 164 extends to the terminal 165 of a thermostatic switch 166, which may be bimetallic, and which has a contact 168 which is connected by conductor 169 to an electric heater 167. The other terminal of the electric heater is connected by conductor 156 to plug 157.

The circuit preferably includes a conductor 171 leading from condenser 164 to conductor 191, door switch 190, conductor 189, and cabinet light 188 for closing the circuit to the cabinet light whenever the door is opened. The other terminal of the cabinet light is connected to common conductor 156.

The circuit also preferably includes a breaker strip heater 160, which is connetced to the conductor 156 by conductor 161 and connected to conductor 164 by conductor 170.

The location of heaters in the cabinet is shown in Fig. 24, where the electric breaker strip heater 160 extends across the bottom of the cabinet and up both sides behind the breaker strip 14.

The lower part of the cabinet is very cold; and the purpose of the breaker strip heater is to warm this part of the cabinet adjacent the door to a sufficient extent to prevent condensation on the door and adjacent the cabinet parts. This condensation may take place at any time when the cabinet is in service; and, therefore, the breaker strip heater is in circuit whenever the circuit is energized at all from the plug 157.

The explanation of the wiring diagram is as follows:

The cabinet light is normally disconnected when the door is closed, but is energized whenever the door is opened. The butter heater is always connected in circuit when the refrigerator is energized, but is controlled by the thermostatic switch 166, which energizes the heater 167 whenever the temperature in the butter container drops to a predetermined temperature.

The breaker strip heater is connected directly to the line conductors 155 and 156 and is energized whenever the refrigerator is connected by means of plug 157. The two cold controls 109 and 110 are in parallel and are opened when the bulbs, which control them, drop in temperature to a predetermined amount.

The cold control switches 109, 110 are closed whenever the bulbs that control them become warmed to a predetermined temperature; and the cold control switch 110 is so adjusted that the lower evaporator is maintained at a below freezing temperature, which may be below ezro. The cold control 109 for the upper evaporator is so adjusted that it will start the compressor operating whenever the temperature in the upper food storage space 28 rises to a predetermined degree, such as, for example, 35 degrees.

Thus the motor compressor is operated whenever either evaporator demands refrigeration.

In some embodiments of the invention the bottom cold control 110 may be omitted and proper temperatures maintained by using only the top cold control 109.

A crisper heater 160a is located in the insulation outside the liner at the crisper drawer height. This heater is bridged across cold controls 109, 110 by conductors 164, 183. This means that if either cold control is closed, the crisper heater is short-circuited. If both cold controls are open and the compressor is not running, the crisper heater is bridged across conductors 155, 159, through the motor windings. The crisper heater is on whenever the compressor is not operating.

Referring to Fig. 24, the crisper heater 160a is located behind the liner in engagement with its rear side at the level of the crisper drawers for raising the temperature of the crisper drawers to a point above freezing, and maintaining a moist, humid storage space inside the crisper drawer which is just above freezing point.

The heater 160a is in circuit and energized only when the compressor is not running, which provides adequate heat for this purpose, which is especially needed at low ambient temperatures, when the crisper drawers might otherwise get too cold. This heater operates when the compressor is off because the compressor operates less at low ambients; and during low running time of the compressor there is a tendency for the crispers to become over-cooled. As the ambient temperature increases the compressor operates more frequently; and there is greater leakage of heat into the upper compartment so that there is less tendency for over-cooling; and there is also less heat supplied by the crisper heater because the time of off periods is diminished; and it is only during off periods that the crisper heater is energized.

The breaker strip heater 160 extends downward behind the breaker strip 14 on the left (Fig. 24) from a point above the crisper drawers. It then extends across the bottom of the door frame behind the breaker strip and up on the right side and back again.

The breaker strip heater is connected across line conductors 155 and 156, and is heated whenever the refrigerator circuit is connected to the line to raise the temperature of the cabinet about the lower part of the door, where the cabinet is coldest to prevent condensation adjacent these parts.

Figure 14:
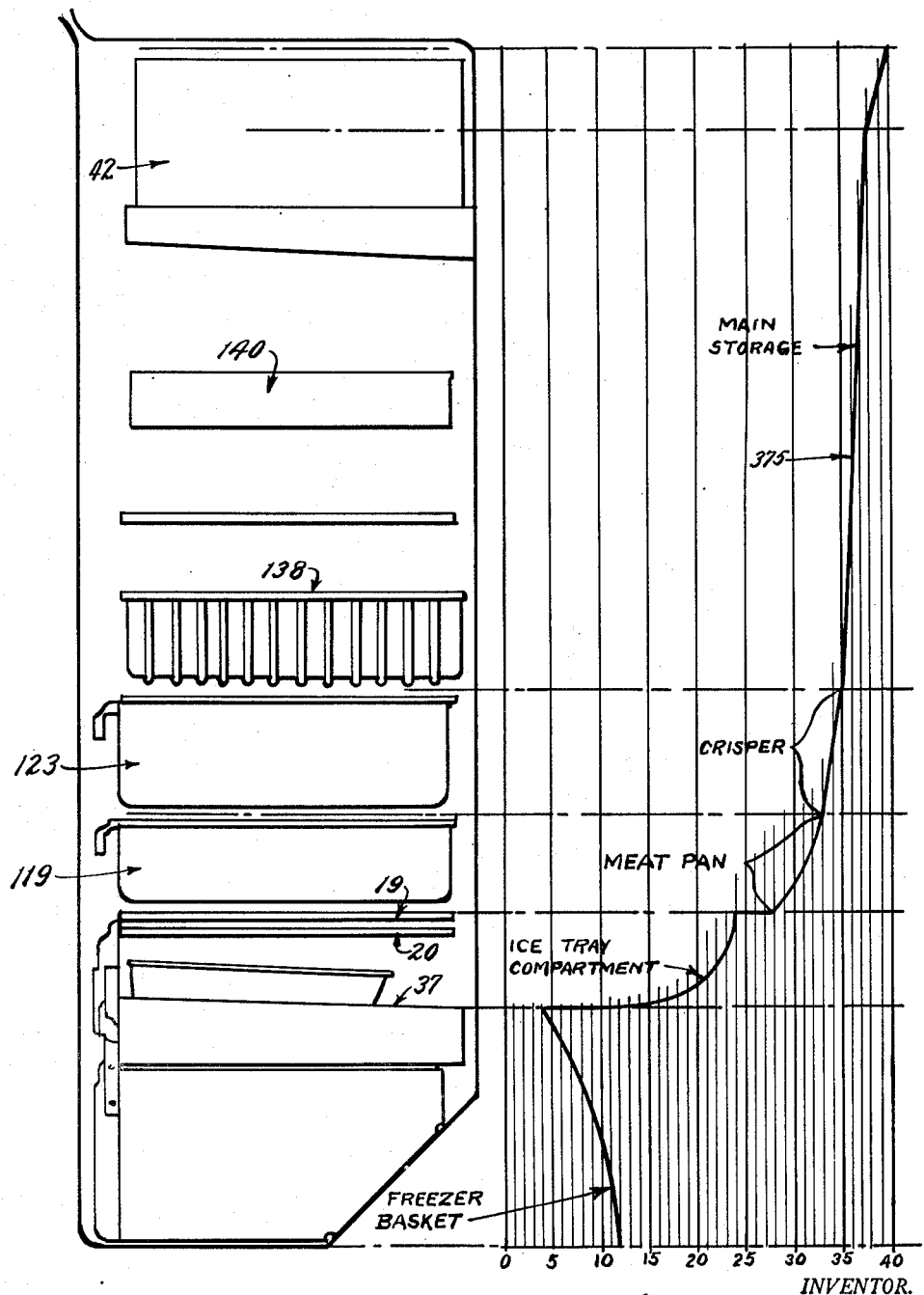
Fig. 14 is a diagram of the contents of the cabinet accompanied by a temperature elevation curve.

Referring to Fig. 14, this is a diagrammatic illustration of one example of the temperature gradient existing from the bottom of the refrigerator to the top. In this diagram 375 indicates a curve which is plotted relative to temperatures Fahrenheit at the various elevations of the parts of the cabinet. The numbers at the bottom of the chart indicate temperatures Fahrenheit.

It is to be understood that these temperatures are merely exemplary and are those which may exist at the lowest normal running adjustment of the cold control 110, which may be adjusted for colder temperatures or warmer temperatures.

For example, at this adjustment the lowest temperature in the cabinet is 4 degrees F. at the level of the lower evaporator shelf 37. The next temperature plotted is 24 degrees F. at the top of the upper partition member 19.

The temperatures in the meat pan elevation vary from 28 degrees F. to 33 degrees F., above the meat pan shelf.

The temperatures in the crisper zone vary from 33 degrees F. at the bottom to 35 degrees F. at the top, above the crisper shelf.

There is a uniform gradient of temperature from the lower part of the bottle basket to the top of the cabinet at a level which extends midway between the top and bottom of the upper evaporator 42, these temperatures varying from 35 degrees F. to 38 degrees F.

The warmest part of the cabinet is just inside the top of the liner, indicated by the chart at 40 degrees F.

Below the lower evaporator 37 the temperatures in this example increase from 4 degrees F. to 12 degrees F., at the bottom of the cabinet.

Referring to Fig. 26, this is a fragmentary sectional view of the drain tube for draining the bottom 112, Fig. 2, of the liner 18 through the aperture 114.

The aperture 114 in the bottom of the liner is provided with a downwardly turned tubular flange 376 for engaging above an annular shoulder 377, on a liner drain fitting 378 of rubber or the like.

This liner drain fitting 378 has an upper substantially cylindrical portion 379 fitting in the aperture 114 in the liner bottom 112, and provided with an annular flange 380 fitting in a recess 381 (Fig. 2) in the liner bottom.

The liner fitting 378 is confined on the liner bottom by the flange 380 and the shoulder 377. Shoulder 377 has a tapered surface 382 on its opposite side so that it may be forced downward through the aperture 114.

A drain ferrule 383 fits inside the enlarged portion 379 of the rubber fitting 378, and overlaps it by means of a flange 384 at the top. A pressed annular rib 385 urges the cylindrical portion 379 outward below the tubular flange 376 and locks the fitting 378 in the aperture 114.

The fitting 378 has a reduced tubular portion 386 extending downward from the larger portion 379 and having a through bore 387 large enough to drain the liner, but small enough to reduce the ingress of warm air into the liner.

Tubular portion 386 discharges at 388 into the pan 115 (Fig. 1) and has an annular flange 389 above the bottom panel 390 of the outer shell and a groove 391 for receiving the edge of the bottom panel 390 at a circular aperture.

There is another annular flange 392 below the groove 391 retaining the tubular portion 386 in fixed position in the bottom panel 390 of the shell.

Thus the liner drain fitting 378 is adapted to drain condensate from the bottom 112 of the liner; but its tubular bore 387 is small enough to reduce to a minimum the leakage of cold air outward or warm air inward.

Referring to Fig. 4, the frozen food basket 118 may consist of a closed drawer or a basket provided with a front facing 360, which substantially closes the lower part of the liner below the lower evaporator 37.

The rollers and guides for the drawer 118 may be substantially the same as described for the bottle basket 138, the guides of which are shown in Figs. 17, 18, and 19. At its upper edge the drawer or basket 118 carries the pivoted door 361 (Fig. 2), which is spring pressed into the position shown in Fig. 2, engaging the partition members 19 and 20.

Pivot door 361 is mounted on the drawer facing 118 by the pivot brackets 393 (Fig. 20). These pivot brackets are secured to the drawer facing by screw bolts 394 (Fig. 21), and carry trunnions 395, which are tubular in shape and provided with axial slots 396 for pivotally mounting the pivoted door 361.

Door 361 may comprise a rectangular metal shell which is closed at the back by a metal plate 397 and provided with rubber bumpers 398 for engaging the partition member 19. At each of its edges the door 361 is provided with a pivot bracket 399 which is secured to the door by screw bolts 400.

Pivot brackets 399 have apertures for the trunnions 395 and are provided with outwardly extending lugs 401 for limiting the range of movement of the pivoted door 361. Bracket 393 has an offset at 402 and is provided with a radial shoulder 403 determining the range of limit of clockwise motion of the door 361 in Fig. 21.

Lug 401 moves about the curved surface 404 and engages shoulder 405 on bracket 393 to prevent further counterclockwise motion of the door 361.

The trunnions 395 have their ends 406 riveted outward outside the brackets 393 to secure the trunnion to the bracket. The door 361 is urged into closed position by the spring 407, Fig. 23, which is a torsion spring provided at each end with an axial portion 408 extending into each trunnion, and with a transverse U-bend 409 extending into the slot 396 of each trunnion.

This mounts both ends of the spring 407 on the drawer and prevents the ends of the spring from rotating. At its central portion the spring 407 is provided with a substantially U-shaped formation 410 extending oppositely to the formations 409 and engaged by a screw bolt 411 and angle bracket 412 for fixedly securing the middle part of the spring to the pivoted door 361.

The spring is initially tensioned and by its torsion urges the door 361 to the position of Fig. 21. Thus the door 361 gives access to the ice cubes or other frozen articles above the lower evaporator 37.

Referring to the top of Fig. 2, the cabinet lamp 188 preferably comprises an elongated bulb located in an elongated cavity 413 in the top of the liner. Bulb 188 is supported by a screw type socket embedded in a resilient rubber fitting 414, having the conductors embedded therein, and provided with an annular groove 415 for receiving the edge of the liner surrounding a circular aperture to retain the fitting 414 in place.

Referring to Figs. 27 to 29, these are views showing a cabinet installation shown in connection with levelling and supporting devices for cooperation with the floor and adjacent wall.

The cabinet 10 has the back panel of its outer shell 11 provided with the condenser which is enclosed in the box-like chimney 416, which may be made of cardboard and which is open at the top 417 and at the bottom 418.

It is highly desirable to protect the condensers and chimney against breakage and also to reinforce the cabinet by using the adjacent wall 419 to space definitely from the wall and prevent vibration or movement of the cabinet.

Therefore, the back panel of the shell 11 may be provided at its upper ends with a flanged fitting 420 at each of the upper corners, the fitting having a tubular inward extension 421 which is threaded at 422 to receive the spacing bolt 423.

The shell 11 has apertures 424 registering with the threaded bore 422, and the fitting 420 is riveted at 425 to the cabinet. A lock nut 426 may be employed if desired. The spacer bolt 423 may comprise a machine bolt, the hexagonal head 427 of which is inserted into a circular or complementary cavity 428 in a cylindrical rubber bumper 429.

The cavity 428 leads to a counterbore 430 which engages about the shank of the bolt holding the bumper on the head of the bolt. When a cabinet has been otherwise installed and levelled, the spacer bolts 423 may be used to space the cabinet from the wall 419 and to give it support from the rear at each of its upper corners.

This enables the firm installation of the cabinet engaging both the wall and the floor in such manner that there is little possibility of the cabinet teetering or being supported in such manner that it might warp its door. The cabinet, of course, should be levelled with regard to the floor 431, and the bottom of the cabinet 10 is provided with four foot pads 432, two of which are shown, the pads being located at the four corners of the bottom panel of the shell 11.

Referring to Fig. 29, here the foot pads are shown on a larger scale and each comprises a stamped sheet metal member of substantially rectangular cup shape provided with an outwardly extending flange 433 which is welded to the bottom panel.

Each foot pad 432 has its bottom provided with a central aperture 434 which registers with a threaded bore in a flanged fitting 435. Fitting 435 has a flange 436 which is welded to the inside of the foot pad 432, and it has a tubular extension 437 provided with a threaded bore 438.

The bore 438 is adapted to receive the threaded shank 439 of the levellers 440, each of which has its threaded shank riveted in a flat circular head 441. All the foot pads are preferably identical and provided with the same bores, but in some embodiments of the invention less than four levellers may be employed.

For example, it may not be necessary to utilize all the levellers to level up the cabinet provided the floor is high at one of the foot pads, and in many other cases the two rear levellers may be eliminated.

The most rigid installation may be obtained by utilizing four levellers and the two spacer posts. When the cabinet has been levelled by means of the levellers and is suitably spaced from the wall, the spacer posts may be screwed out until they engage the wall tightly, thus giving the cabinet six points of support in two different planes for preventing its movement or vibration.

Referring to Fig. 29, this also shows on a larger scale the guides 442 for the condensate evaporation pan 115. The pan 115 comprises a rectangular top-open sheet metal pan provided at each of its side edges with angular rails 443 welded to the side of the pan and having one flange projecting laterally for engagement in the guides 442.

The guides 442 may comprise a main bracket having a body flange 444, an attaching flange 445 welded to the bottom panel, and a drawer suporting flange 446 extending toward the drawer 115. At its forward corner the drawer supporting flange 446 is bent downward at 447.

The pan rail 443 is confined on the guide 442 by an upper angle member 448, which is secured to the body 444, forming a groove for the rail 443.

The upper angle member 448 has its forward corner 449 bent upward for convenient reception tof the sliding rail 443.

One of the most important features of the present invention is the proportioning of the amount of refrigerant in the system in relation to the space or volume which is provided with refrigerant and for oil in the system, and the method of refrigeration which results from properly proportioning the refrigerant to the volumes, as stated.

For example, in one refrigerator embodying the invention the petroleum lubricating oil charge may amount to 600 cc., while the charge of F-12 refrigerant may amount to 15.5 ounces in a system in which the internal volumes are as follows:

*Internal volumes*

Oil volume in compressor sump _____ cc___ 550
Gas volume in motor and compressor
  housing _____ cc___ 1080
Volume of preliminary and main condenser and
  other connecting tubing _____ cc___ 260
Volume of upper evaporator tubing_____ cc___ 65
Volume of lower evaporator tubing_____ cc___ 110
Volume of lower evaporator header
  or receiver_____ cc___ 215

The operation of the refrigeration system with the foregoing proportion of refrigerant and oil in relation to the internal volume of the system is as follows:

At low ambient temperatures the oil in the system will absorb an amount of refrigerant which will cause the upper evaporator to be normally in a starved condition. The absorption of refrigerant in the oil increases as the temperature of the oil drops; and the refrigerant is driven out of the oil as the temperature of the oil rises.

At higher ambient temperatures less refrigerant is absorbed in the oil; and therefore more refrigerant is available for the upper evaporator, which is ordinarily cooled mainly by superheated gas. This causes the refrigerator to operate on a defrosting cycle at lower room temperatures. At higher room temperatures considerable frost may accumulate on the upper part of the upper evaporator during heavy load conditions; but the area of the upper evaporator is preferably such that it will be made large enough so that defrosting may occur during the lighter load periods.

It should be understood that the volume of the gas and the oil spaces in refrigeration systems embodying my invention may be varied, providing the proportionate amount of oil and refrigerant is also varied; and the foregoing charge of oil and refrigerant is merely exemplary of one condition.

The following is a tabulation of the refrigerant distribution at the two ambient temperatures of 110 degrees and 70 degrees at the start and at the stop of the motor compressor and is also exemplary of the distribution of refrigerant for a refrigerator embodying the invention with the above-mentioned proportions of oil, refrigerant, and volumes:

REFRIGERANT DISTRIBUTION

| Ambient Temperatures | 110° | | 70° | |
|---|---|---|---|---|
| Compressor operation | Start | Stop | Start | Stop |
| Ounces of refrigerant absorbed in oil | 3 | 5 | 7 | 8.5 |
| Ounces of refrigerant vapor in motor compressor housing and condenser | 1.9 | 4.2 | 1.4 | 2.1 |
| Ounces of refrigerant in lower evaporator tubing | 3 | 4 | 2 | 4 |
| Ounces of refrigerant in upper evaporator tubing | 0 | 2.3 | 0 | .5 |
| Ounces of refrigerant in the receiver | 7.6 | 0 | 5.1 | .4 |
| Suction pressure at compressor inlet | 23 | 5 | 16 | 4 |
| Discharge pressure at compressor outlet | 90 | 204 | 65 | 100 |
| Oil temperature in oil sump | 178 | 190 | 107 | 112 |

It will be noted that there is more refrigerant absorbed in the oil after the running of the compressor than at the start of the compressor, although the oil temperature in the oil sump is higher when the compressor stops. The reason for this is that while the oil temperature rose during the operation of the compressor, the pressure in the housing rose so much that it more than offset the rise in oil temperature, in so far as absorption of refrigerant is concerned.

Comparing the refrigerant absorbed in the oil at the ambient temperatures of 110 degrees and 70 degrees, it is found that a much greater proportion of oil is adsorbed in the refrigerant at 70 degrees ambient temperature than at 110 degrees ambient temperature. As the ambient temperature increases less refrigerant is adsorbed in the oil and more refrigerant becomes available for cooling the upper evaporator.

As the ambient temperature drops more refrigerant is absorbed in the oil, as seen under 70 degrees; and less refrigerant is available for cooling the upper evaporator, as seen under refrigerant in the upper evaporator, last column, 0.5 ounces.

The great difficulty in the prior art devices has been to keep the main portion of the cabinet from being overcooled under low room temperature conditions, when there is less leakage of heat into the main portion of the cabinet and less cooling is required for the upper food storage zone.

This difficulty is eliminated in the present invention by the proper proportioning of the oil and refrigerant and the volumes of the upper and lower evaporators and other internal volumes, so that the evaporator for the upper food storage space, which is maintained at above freezing temperatures, is starved of refrigerant progressively as the room temperature decreases.

Referring to the above tabulation, the decreased temperature of the oil at 70 degrees ambient temperature has resulted in increased absorption of refrigerant because of less running time of the motor compressor, and the major portion of the refrigerant which is in the evaporators is in the lower evaporator.

Under low room temperature conditions there is quite a high percentage of refrigerant absorbed in the oil; and the unit starts up with the top evaporator completely dry and the lower evaporator partly dry. Under high room temperature conditions there is less refrigerant absorbed by the oil; and the unit starts with the bottom evaporator full and the top evaporator partly full. The amount of refrigerant absorbed by the oil causes less refrigerant to be available for the upper evaporator, which cools the food storage space; but there is always sufficient refrigerant to cool the freezing plate or lower evaporator, which is constantly maintained at a below freezing temperature.

Advantage is taken of the fact that lower percent of running time of the motor compressor decreases the temperature of the mineral oil, which causes it to absorb more refrigerant at lower room temperatures, when the above-freezing food storage space does not need so much refrigeration.

It is found that when the compressor starts, any liquid refrigerant remaining in the top evaporator and part of that remaining in the bottom evaporator is pulled over into the receiver. During the running cycle this refrigerant gradually evaporates from the receiver and is fed back into the circuit to fill first the lower evaporator and finally the top evaporator.

At 110 degrees ambient at the end of the running cycle the top evaporator is almost full, while at 70 degrees ambient temperature at the end of the running cycle only a small part of the top evaporator is refrigerated. At intermediate temperatures there is a proportionate change in the amount of refrigeration accomplished by the top evaporator.

The present application relates particularly to the method of refrigeration, which is described as follows:

The method of refrigeration involves the refrigeration of an insulated cabinet which is divided into an upper above-freezing zone and a lower below-freezing zone by insulating partition members spaced sufficiently from the walls of the liner to permit moisture on the liner or in the air in the upper compartment to be moved by diffusion to the lower and colder evaporator.

It involves the use of an upper evaporator cooled below freezing so that it will accumulate frost, but will never accumulate ice which is caused by sweating; and the upper evaporator, although below freezing, cools the larger above-freezing zone to an above-freezing temperature.

The method includes the use of a lower freezing evaporator, which may be maintained at a below-freezing temperature for cooling a lower frozen food storage space and for frozen ice cubes and food; and the two evaporators are in unrestricted communication with each other, the refrigerant going first to the lower evaporator and thereafter to the upper evaporator and thence to a receiver on the lower evaporator.

By this method the upper evaportaor only gets such refrigerant as is left over from cooling the lower evaporator; and the upper evaporator is cooled mainly by superheated refrigerant gas and cooled only in the amount which is necessary to maintain the upper above-freezing zone at a suitable temperature at its upper end for the storage of food above freezing.

The method includes the stratification of the air in different temperature layers, which decrease in temperature from the bottom of the cabinet to the top; and this is brought about by establishing the lower compartment temperature at a below freezing temperature and establishing the upper cabinet temperature at the maximum above freezing temperature contemplated, and interposing a plurality of successive insulating barriers between the main partition members and the upper end of the cabinet.

The method involves the use of insulating barriers, which also serve the useful purpose of supporting foods to be preserved at different temperatures, increasing from the bottom to the top, and thus involves the use of drawers, covers, and baskets, all of which support foods and also cause stratification of the air in layers of different temperature.

The present method includes the use of a motor compressor having a predetermined motor housing volume and an oil sump communicating with the motor housing, and having a predetermined volume for oil, with a predetermined charge of oil.

It includes the use of upper evaporator tubing and lower evaporator tubing and communicating tubing of predetermined volume in relation to the charge of refrigerant, and the use of a preliminary condenser having sufficient tubing and radiating fins or wires to effect the cooling of the motor compressor.

The method includes the proper proportioning in size of the main condenser and the area of its heat dissipating fins or wires to liquefy the refrigerant returned to the motor housing from the preliminary condenser; and the volumes of the condensers are also suitably proportioned in relation to the volumes of the evaporators and motor compressor.

According to the present method, at low ambient temperatures a large proportion of the refrigerant is absorbed in the oil; and a minimum amount of refrigeration is accomplished by the upper evaporator because there is less refrigerant available for the upper evaporator after cooling the lower evaporator.

There is also less leakage of heat through the insulated casing into the upper above-freezing storage zone, so that less cooling is required.

According to my method the refrigerant is released by the oil in gradually increasing amounts as the ambient temperature increases; and more refrigerant is made available for cooling the upper evaporator after first cooling the lower evaporator at higher ambient temperatures.

At higher ambient temperatures there is greater leakag of heat through the insulating cabinet into the upper above-freezing zone so that more cooling of the upper zone is required and is provided by this method by the increased amount of refrigerant available.

According to my method the lower below-freezing temperature is always maintained at a suitable below-freezing temperature, which may vary as long as it maintains the food in a frozen condition.

The above method includes the control of the compressor by thermostatically controlled switches responsive to the air temperature in the upper compartment and responsive to the evaporator temperature in the lower compartment, these controls being connected in parallel so that when either compartment requires refrigeration, the motor compressor operates, thus insuring adequate refrigeration in both compartments responsive to the load in either compartment.

The operation of the refrigeration system will already be apparent from the description of the method. The arrangement of the present cabinet contents is such that all the storage space arranged for below-freezing food storage, to which access is had least often, is at the lowermost part of the cabinet, where a drawer is provided to bring the frozen food out into full vision.

The ice cubes and space for freezing food above the freezing evaporator are next in order from the bottom because these are next in order of frequent access.

The meat storage pan, which should be at a near freezing temperature, is next above the partition members.

The crispers for storage of vegetables and similar articles are arranged next above the meat pan.

The bottle basket, which may contain beverages, also is arranged next above the crispers at a point where access is most convenient.

Above these there are located the combined serving tray and shelf and an uppermost shelf at the top at the point of maximum temperature.

Locating the frozen food storage, which is below freezing temperature, at the lowest part of the cabinet, tends to keep the cold air in that part of the cabinet and reduces the tendency for cold air to spill out when the door is opened.

The ice cube space and frozen food storage are closed by the drawer facing and pivoted ice cube door so that a minimum amount of cold air is lost from these spaces when only the main door is opened.

The above-freezing storage compartment is prevented from becoming over-cooled under light load and low ambient operating conditions because the quantity of liquid refrigerant available for cooling the upper evaporator is severely limited during a good portion of the refrigeration cycle.

The refrigerant liquid normally available to fill this evaporator is withheld from the system under these conditions because of absorption in the oil charge and the proper proportioning of high side volume value. When the load is increased, more refrigerant is available because the oil becomes heated.

The present refrigerator is thus adapted to provide storage space of suitable temperature for all kinds of food which the householder may desire to store in a refrigerator; and the temperatures are maintained efficiently and economically with a minimum amount of baffling and of regulating devices.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States, is:

1. A refrigerator cabinet leveling and supporting structure comprising an outer metal shell having a substantially rectangular bottom panel and a substantially rectangular back panel, metal foot pads secured to the bottom of said bottom panel adjacent the four corners of said bottom panel, each of said foot pads having an inwardly extending threaded bore in its bottom, a threaded member in each threaded bore, and having a large flat head for engaging the floor to support the cabinet bottom in level position on the floor in spite of irregularities in the height of different parts of the floor, the said pads and threaded members spacing the bottom panel from the floor, a pair of Z brackets welded to the bottom panel and forming parallel guides, an angle member welded to each Z bracket to form a parallel guide flange, and a metal condensate pan spaced from the bottom panel and from the floor for air circulation on all sides, and having an angle bracket secured to its opposite sides with a flange of said angle bracket sliding between each of the parallel guide flanges, the leading edges of said parallel guide flanges being bent apart to guide the drawer angle bracket flanges between them.

2. A refrigerator cabinet leveling and supporting structure comprising an outer metal shell having a substantially rectangular bottom panel and a substantially rectangular back panel, metal foot pads secured to the bottom of said bottom panel adjacent the four corners of said bottom panel, each of said foot pads having an inwardly extending threaded bore in its bottom, a threaded member in each threaded bore, and having a large flat head for engaging the floor to support the cabinet bottom in level position on the floor in spite of irregularities in the height of different parts of the floor, a pair of tubular members carried by the back panel on the inside thereof adjacent the upper angles of said back panel, each tubular member having a flange secured to the back panel, and a threaded bore registering with a bore in the back panel, a threaded rod in each said latter threaded bore, and a resilient head carried by the end of each rod for adjustably engaging an adjacent wall, for steadying the cabinet in level position by means of the wall, in spite of irregularities in spacing between the cabinet and wall, said cabinet having a rear condenser and chimney flue between the cabinet and wall and of less dimension between the panel and wall than the length of said rods, the said rods spacing the cabinet from the wall a greater distance than the projection of said chimney, and protecting the chimney from engagement with the wall.

3. In a refrigerator, a cabinet having an inner liner and a freezing shelf in said liner to receive a frozen food drawer below said shelf, a combined frozen food drawer and shelf closure comprising a drawer for frozen food, having a closed facing wall extending from one liner side wall to the other liner side wall below said freezer shelf, a flat metal bracket secured to each edge of said facing wall and projecting above said wall, a hollow cylindrical sheet metal trunnion having a pair of rivet flanges passing through slots in each bracket and projecting inwardly above said facing wall, a pivoted door having lateral border flanges provided with apertures to pass said trunnions to pivot said door to the top of said facing wall, a single torsion spring having two straight end portions, each of which extends into one of said hollow trunnions, and having a transverse U-shaped formation located in a slot in the end of each trunnion to secure the ends of the spring against torsional movement, said spring extending along the lower edge of said pivoted door, and having a medial transverse U-shaped formation secured to the door to be twisted with the door, and biasing the door to closed position.

4. The method of refrigeration of an insulated cabinet having a first below-freezing zone cooled by first below-freezing coils, and a second above-freezing zone cooled by second coils, which comprises withdrawing refrigerant under suction from said second coils in vapor form and compressing the refrigerant to hot gaseous form, passing the hot compressed refrigerant gas through a condenser to liquefy it, passing the liquid refrigerant through a restrictor passage to said first below-freezing coils, and thereafter without restriction to said second coils, the amount of refrigerant supplied being proportioned to the space for refrigerant in said coils, and an additional amount of refrigerant being absorbed in lubricating oil in the system at ordinary ambient temperatures, a larger portion of said refrigerant being absorbed in the oil at lower ambient temperatures, and a lesser portion of refrigerant being absorbed in oil at higher temperatures, the amount of refrigerant not absorbed and supplied to said first coils being sufficient to maintain a below-freezing temperature in the below-freezing zone at the highest ambient temperature contemplated, and the amount of refrigerant which is available for said second coils being sufficient for cooling said second above-freezing zone at a suitable above-freezing temperature at ordinary ambients, and the refrigerant which is supplied to said coils being sufficient for increasing proportionately the cooling effect of said second coils at higher ambients, due to the release of absorbed refrigerant from the oil at higher ambients, but decreasing the cooling effect of said second coils proportionately at lower ambients, due to the greater absorption of refrigerant in the oil at lower ambients, to avoid over-cooling or under-cooling the said second above-freezing zone, while maintaining below-freezing temperatures in the first below-freezing zone at all times.

5. The method of refrigeration of an insulated cabinet having a first below-freezing zone cooled by first below-freezing coils, and a second above-freezing zone cooled by second coils, which comprises withdrawing a refrigerant under suction from said second coils in vapor form and compressing the refrigerant to hot gaseous form, passing the hot compressed refrigerant gas through a condenser to liquefy it, passing the liquid refrigerant through a restrictor passage to said first below-freezing coils, and thereafter without restriction to said second coils, the amount of refrigerant supplied being proportioned to the space for refrigerant in said coils, and an additional amount of refrigerant being absorbed in lubricating oil in the system at ordinary ambient temperatures, a larger portion of said refrigerant being absorbed in the oil at lower ambient temperatures, and a lesser portion of refrigerant being absorbed in oil at higher temperatures, the amount of refrigerant not absorbed and supplied to said first coils being sufficient to maintain a below-freezing temperature in the below-freezing zone at the highest ambient temperature contemplated, and the amount of refrigerant which is available for said second coils being sufficient for cooling said second above-freezing zone at a suitable above-freezing temperature at ordinary ambients, and the refrigerant which is supplied to said coils being sufficient for increasing proportionately the cooling effect of said second coils at higher ambients, due to the release of absorbed refrigerant from the oil at higher ambients, but decreasing the cooling effect of said second coils proportionately at lower ambients, due to the greater absorption of refrigerant in the oil at lower ambients, to avoid over-cooling or under-cooling the said second above-freezing zone, while maintaining below-freezing temperatures in the first below-freezing zone at all times, the said coils each conducting heat to refrigerant in the coils from a sheet metal evaporator part engaging each coil and providing heat absorbing surfaces for absorbing heat in said zones.

6. The method of refrigeration of an insulated cabinet having a first below-freezing zone cooled by first below-freezing coils, and a second above-freezing zone cooled by second coils, which comprises withdrawing refrigerant under suction from said second coils in vapor form and compressing the refrigerant to hot gaseous form, passing the hot compressed refrigerant gas through a condenser to liquefy it, passing the liquid refrigerant through a restrictor passage to said first below-freezing coils, and thereafter without restriction to said second coils, the amount of refrigerant supplied being proportioned to the space for refrigerant in said coils, and an additional amount of refrigerant being absorbed in lubricating oil in the system at ordinary ambient temperatures, a larger portion of said refrigerant being absorbed in the oil at lower ambient temperatures, and a lesser portion of refrigerant being absorbed in oil at higher temperatures, the amount of refrigerant not absorbed and supplied to said first coils being sufficient to maintain a below-freezing temperature in the below-freezing zone at the highest ambient temperature contemplated, and the amount of refrigerant which is available for said second coils being sufficient for cooling said second above-freezing zone at a suitable above-freezing temperature at ordinary ambients, and the refrigerant which is supplied to said coils being sufficient for increasing proportionately the cooling effect of said second coils at higher ambients, due to the release of absorbed refrigerant from the oil at higher ambients, but decreasing the cooling effect of said second coils proportionately at lower ambients, due to the greater absorption of refrigerant in the oil at lower ambients, to avoid over-cooling or under-cooling the said second above-freezing zone, while maintaining below-freezing temperatures in the first below-freezing zone at all times, the said method being carried on in alternate cycles of compression or no compression, and the cycle of compression being initiated and terminated responsive to temperature in said second zone.

7. In a household refrigerator, the combination of an outer shell, an inner liner, insulation disposed between said shell and liner, forming a cabinet having top wall, bottom wall, rear wall, and side walls and provided with a front opening, an insulated door for said opening, an L-shaped evaporator plate located in the lower part of said liner and extending from side wall to side wall, but spaced from the side liner walls to permit condensate to pass the said evaporator plate, being provided with sinuous coils on its lower side, and having an elongated receiver secured to its upper side near the rear wall, a frozen food drawer slidably mounted in said liner below said evaporator plate, said drawer being provided on each of its sides with an angular track having a laterally projecting flange and provided with an outwardly projecting roller at the rear end of each track, said drawer having a front facing extending to said evaporator shelf, and said facing supporting a pivotally mounted door for closing the space above said shelf, a pair of molded plastic guides carried by the side walls of said liner, below said evaporator plate, and formed with a groove for receiving the drawer tracks, and with inwardly projecting upper and lower flanges for excluding ice from the tracks, each guide having a roller mounted at its forward end, a channelled member carried by Z brackets on each side wall of the liner, above said evaporator plate, and a pair of insulating partition members carried by the inwardly projecting flanges of said channels, for defining a lower freezing compartment, but spaced from the liner walls for passage of condensate, a second pair of channelled members carried by Z brackets on the liner walls, above said partition members, and forming guides, a bottle beverage drawer having outwardly projecting flanges slidably mounted on the lowermost flange of said latter channels, and having an insulating cover plate mounted on the uppermost flanges of said latter channels, but spaced from the side walls for passage of condensate, the said liner bottom being provided with sloping portions converging toward a central aperture, a resilient rubber tube having upper and lower shoulders embracing the liner bottom about said central aperture, the said tube extending through an aligned aperture in the bottom of said liner, for discharging condensate from the walls of said liner, which passes said drawers, covers, and partitions, and is drained to said sloping bottom wall.

8. In a household refrigerator, the combination of an outer shell, an inner liner, insulation disposed between said shell and liner, forming a cabinet having top wall, bottom wall, rear wall, and side walls and provided with a front opening, an insulated door for said opening, an L-shaped evaporator plate located in the lower part of said liner and extending from side wall to side wall, but spaced from the side liner walls to permit condensate to pass the said evaporator plate, being provided with sinuous coils on its lower side, and having an elongated receiver secured to its upper side near the rear wall, a frozen food drawer slidably mounted in said liner below said evaporator plate, said drawer being provided on each of its sides with an angular track having a laterally projecting flange and provided with an outwardly projecting roller at the rear end of each track, said drawer having a front facing extending to said evaporator shelf, and said facing supporting a pivotally mounted door for closing the space above said shelf, a pair of molded plastic guides carried by the side walls of said liner, below said evaporator plate, and formed with a groove for receiving the drawer tracks, and with inwardly projecting upper and lower flanges for excluding ice from the tracks, each guide having a roller mounted at its forward end, a channelled member carried by Z brackets on each side wall of the liner, above said evaporator plate, and a pair of insulating partition members carried by the inwardly projecting flanges of said channels, for defining a lower freezing compartment, but spaced from the liner walls for passage of condensate, a second pair of channelled members carried by Z brackets on the liner walls, above said partition members, and forming guides, a bottle beverage drawer having outwardly projecting flanges slidably mounted on the lowermost flange of said latter channels, and having an insulating cover plate mounted on the uppermost flanges of said latter channels, but spaced from the side walls for passage of condensate, the said liner bottom being provided with sloping portions converging toward a central aperture, a resilient rubber tube having upper and lower shoulders embracing the liner bottom about said central aperture, the said tube extending through an aligned aperture in the bottom of said liner, for discharging condensate from the walls of said liner, which passes said drawers, covers, and partitions, and is drained to said sloping bottom wall, the said liner also supporting on its side walls, above said bottle drawer, a pair of inwardly turned channels by means of Z brackets, front and rear frame members mounted on said latter channels, and each supporting a plurality of other oppositely located channels serving as guides for a pair of vegetable drawers and a central egg basket, and a pair of vegetable drawers and an egg basket having outwardly turned guide flanges mounted in said latter channels, and an insulating cover carried by the said channels above said vegetable drawers and egg basket, but spaced from the walls of said liner.

9. In a refrigerator cabinet, a door structure for closing a space above a freezing shelf, comprising a support, a pair of upwardly projecting side brackets carried by said support, an inwardly extending trunnion carried by each of said side brackets, an insulating door comprising a rectangular shell provided with border flanges on four sides and with an inside cover plate, the said door having opposite end border flanges provided with apertures for receiving said trunnions, and a torsion spring located in said door shell, and having its ends secured against twisting relative to each of said trunnions, said torsion spring having a central portion fixedly secured to said door shell, the spring being initially tensioned to turn said door to closed position, but permitting the door to be opened forwardly by twisting said spring and rotating on said trunnions to give access to the space above said freezer shelf.

10. In a refrigerator cabinet, a door structure for closing a space above a freezing shelf, comprising a support, a pair of upwardly projecting side brackets carried by said support, an inwardly extending trunnion carried by each of said side brackets, an insulating door comprising a rectangular shell provided with border flanges on four sides and with an inside cover plate, the said door having opposite end border flanges provided with apertures for receiving said trunnions, and a torsion spring located in said door shell, and having its ends secured against twisting relative to each of said trunnions, said torsion spring having a central portion fixedly secured to said door shell, the spring being initially tensioned to turn said door to closed position, but permitting the door to be opened forwardly by twisting said spring and rotating on said trunnions to give access to the space above said freezer shelf, the said door being provided at each of its ends with a stop bracket plate having an outwardly projecting lug for engaging said upwardly projecting side bracket at an upper stop surface when the door is in open position and at a lower stop surface when the door is in closed position.

References Cited in the file of this patent

UNITED STATES PATENTS

| Number | Name | Date |
| --- | --- | --- |
| 609,380 | Yeager | Aug. 16, 1898 |
| 1,159,220 | Heines | Nov. 2, 1915 |
| 1,810,843 | Moecker | June 16, 1931 |
| 1,837,293 | Sanford | Dec. 22, 1931 |
| 2,253,804 | Norberg | Aug. 26, 1941 |
| 2,292,865 | Boddy | Aug. 11, 1942 |
| 2,416,845 | Richard | Mar. 4, 1947 |
| 2,488,161 | Benson et al. | Nov. 15, 1949 |
| 2,526,747 | Heilig | Oct. 24, 1950 |
| 2,573,272 | Petkwitz | Oct. 30, 1951 |
| 2,578,906 | Tobey | Dec. 18, 1951 |
| 2,633,003 | Jordan | Mar. 31, 1953 |
| 2,647,375 | Zearfoss | Aug. 4, 1953 |
| 2,660,037 | Cooper | Nov. 24, 1953 |
| 2,663,999 | Alsing | Dec. 29, 1953 |